(12) United States Patent
Akiho et al.

(10) Patent No.: US 7,050,007 B2
(45) Date of Patent: May 23, 2006

(54) ELECTRONIC DEVICE WITH COMMUNICATION CAPABILITY

(75) Inventors: Hiraku Akiho, Miyagi (JP); Yutaka Okazaki, Tokyo (JP); Kazuo Goto, Kanagawa (JP); Akihiro Kikuchi, Chiba (JP); Junichi Sawada, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/497,114

(22) PCT Filed: Sep. 5, 2003

(86) PCT No.: PCT/JP03/11395

§ 371 (c)(1),
(2), (4) Date: Sep. 24, 2004

(87) PCT Pub. No.: WO2004/029870

PCT Pub. Date: Apr. 8, 2004

(65) Prior Publication Data

US 2005/0040997 A1   Feb. 24, 2005

(30) Foreign Application Priority Data

Sep. 27, 2002   (JP) ............................. 2002-284177
Jan. 31, 2003   (JP) ............................. 2003-025288

(51) Int. Cl.
*H01Q 1/24*   (2006.01)
(52) U.S. Cl. ...................................... 343/702; 343/866
(58) Field of Classification Search ................ 343/702, 343/741, 742, 866, 867; 235/462.15; 455/90.3
See application file for complete search history.

(56) References Cited

U.S. PATENT DOCUMENTS

| | | | |
|---|---|---|---|
| 2003/0111541 A1* | 6/2003 | Washino et al. | 235/492 |
| 2004/0028295 A1* | 2/2004 | Allen et al. | 382/313 |
| 2004/0225918 A1* | 11/2004 | Fruhauf et al. | 714/30 |
| 2004/0245348 A1* | 12/2004 | Nagaoka et al. | 235/492 |
| 2004/0256468 A1* | 12/2004 | Akiho et al. | 235/492 |
| 2005/0001031 A1* | 1/2005 | Akiho et al. | 235/451 |

FOREIGN PATENT DOCUMENTS

| | | |
|---|---|---|
| JP | 8-16745 A | 1/1996 |
| JP | 9-284038 A | 10/1997 |
| JP | 09284038 A | 10/1997 |
| JP | 10-107531 A | 4/1998 |
| JP | 10-157353 A | 6/1998 |
| JP | 11-203422 A | 7/1999 |
| JP | 2000-68891 A | 3/2000 |
| JP | 2000-162314 A | 6/2000 |
| JP | 2000162314 A | 6/2000 |

(Continued)

*Primary Examiner*—Tan Ho
(74) *Attorney, Agent, or Firm*—Wolf, Greenfield & Sacks, P.C.

(57) ABSTRACT

A communication-capable electronic device is provided which includes a metallic housing (122) to accommodate electronic parts of the device, and a communication terminal (90) that makes communications with a communication-cable IC card (110) incorporating an antenna (115). The communication antenna (90) is located such that when the IC card is placed near the housing (122), the antenna (115) built in the IC card (110) faces, at a part thereof, a part of the communication terminal (90) while the rest of the antenna (115) of the IC Card (110) does not face the housing (122). Thus, it is possible to prevent the inductance in the antenna (115) of the IC card (110) from being reduced.

16 Claims, 19 Drawing Sheets

FOREIGN PATENT DOCUMENTS

| | | |
|---|---|---|
| JP | 2001-28510 A | 1/2001 |
| JP | 2001056847 A | 2/2001 |
| JP | 2001-167211 A | 6/2001 |
| JP | 2001-167237 A | 6/2001 |

* cited by examiner

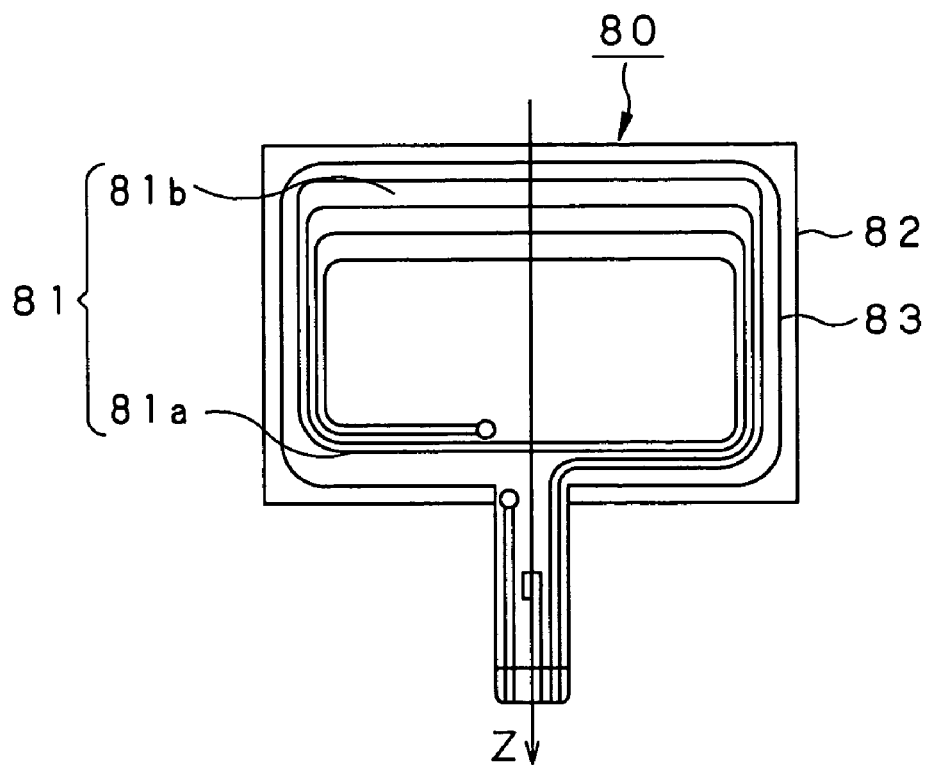
F I G. 8
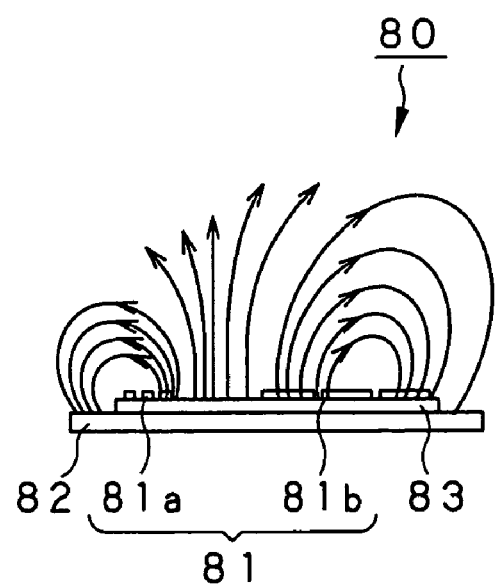
F I G. 9

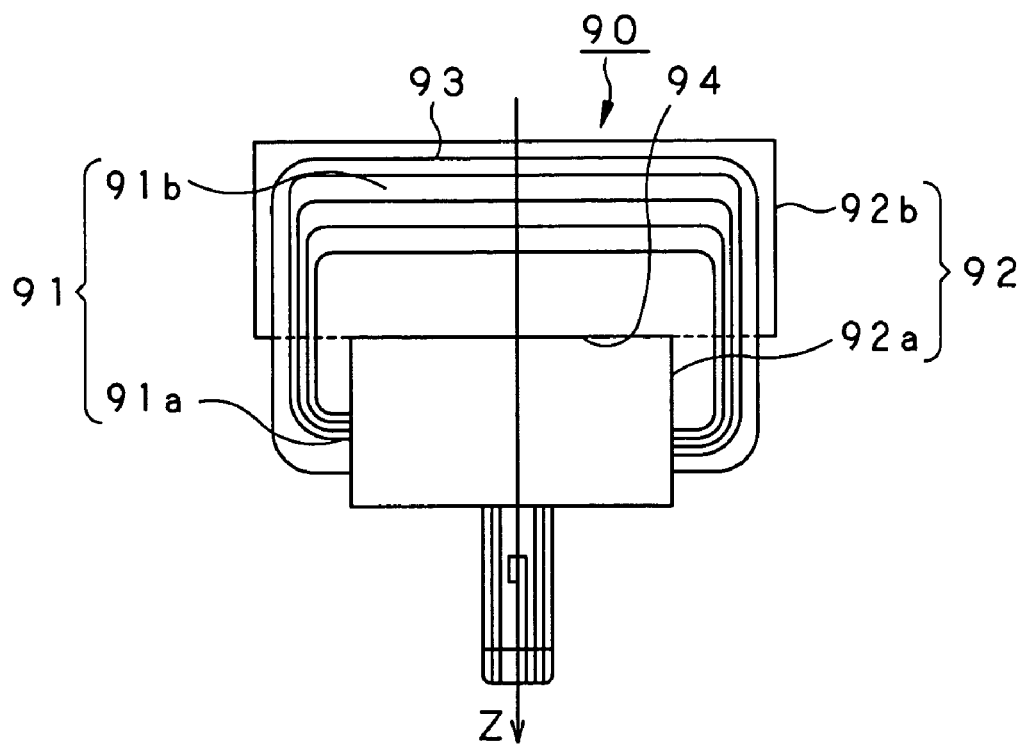
F I G. 10
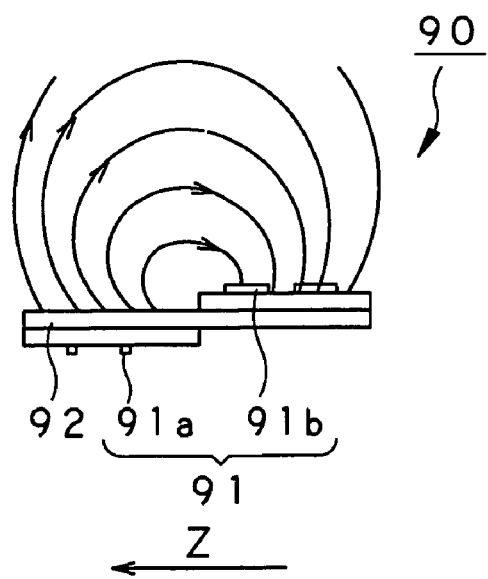
F I G. 11

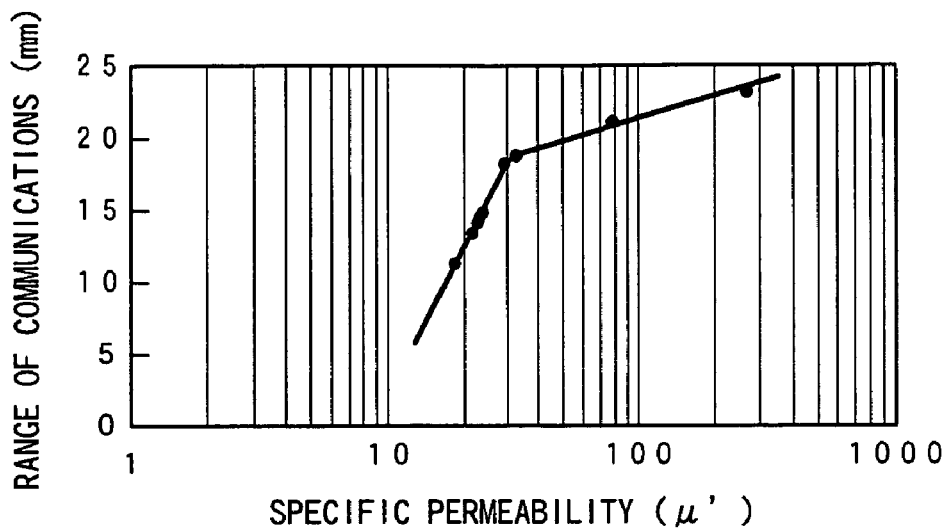
F I G. 1 2
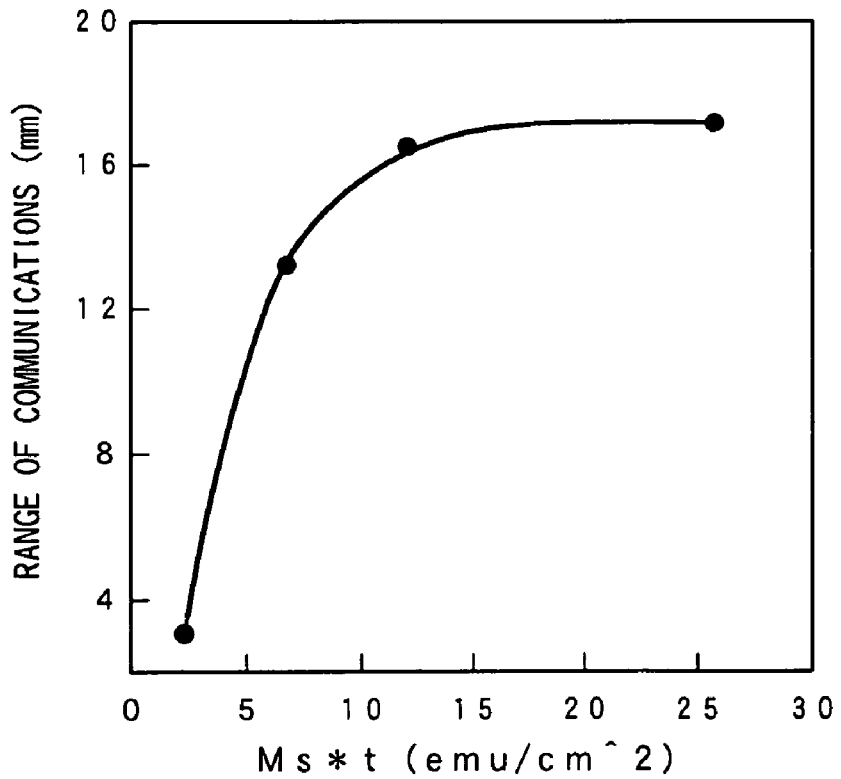
F I G. 1 3

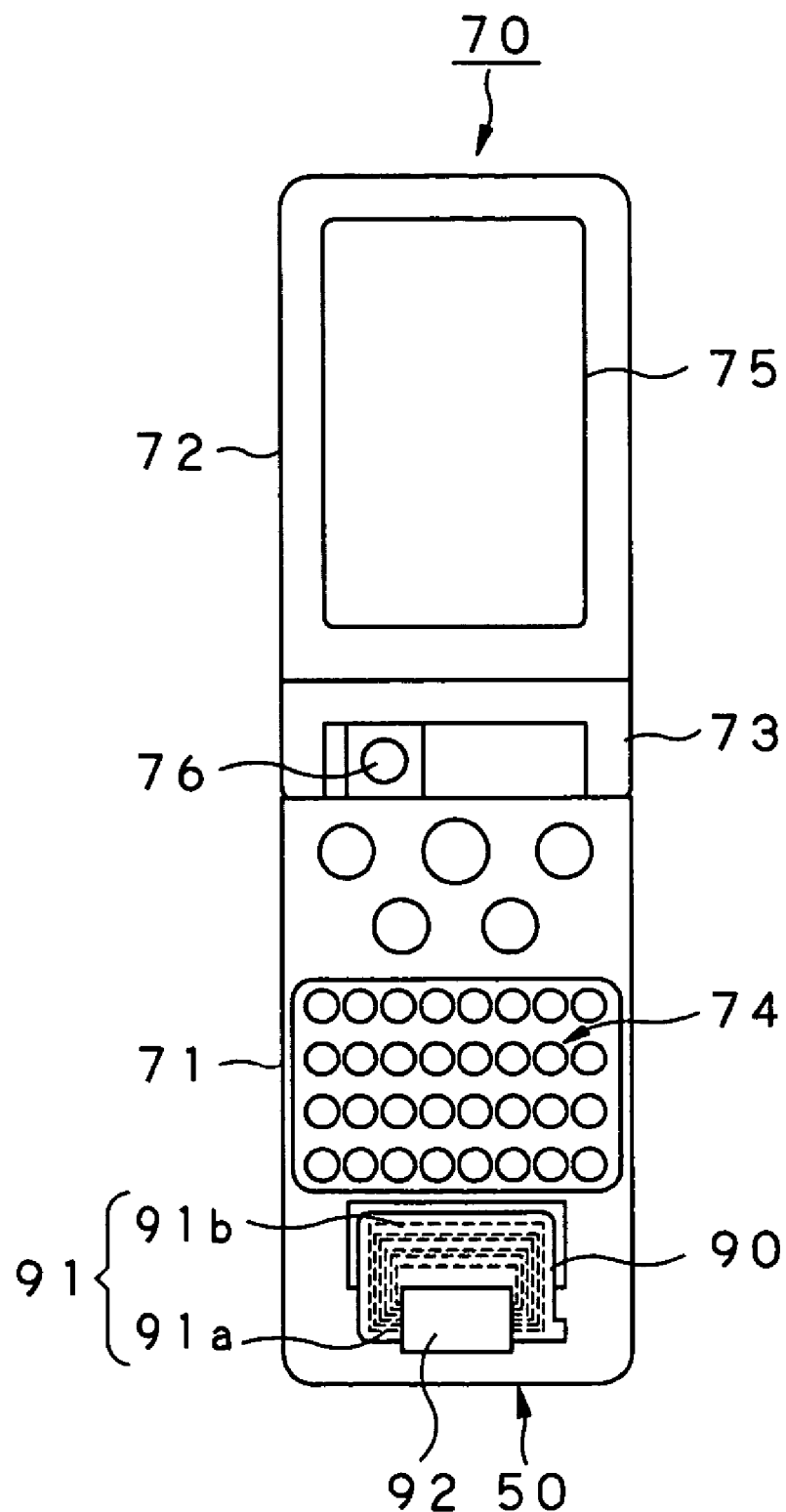
F I G. 18

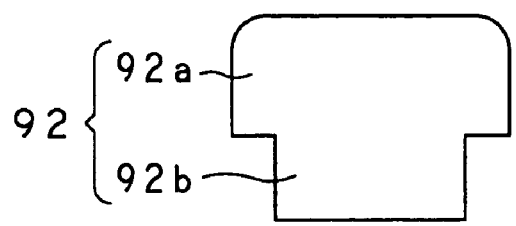 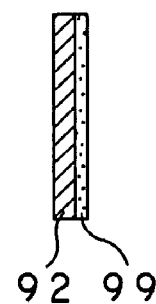
F I G. 2 4 A  F I G. 2 4 B
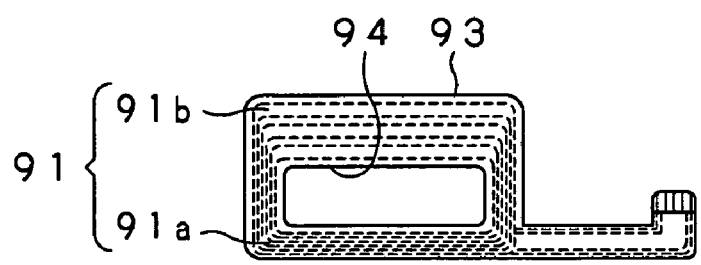
F I G. 2 5
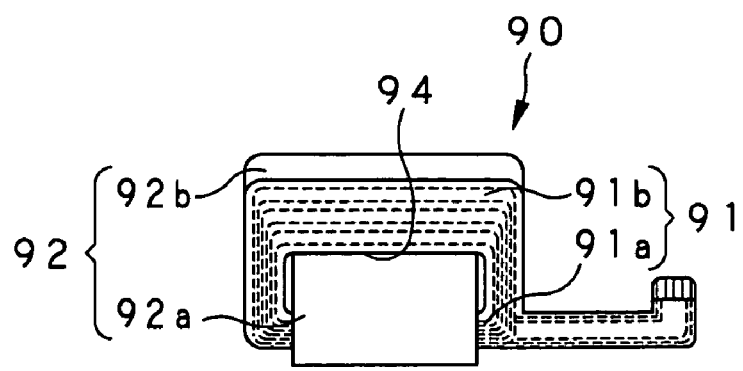
F I G. 2 6

ELECTRONIC DEVICE WITH COMMUNICATION CAPABILITY

This application is a 371 of PCT/JP03/11395 filed on Sep. 5, 2003.

TECHNICAL FIELD

The present invention relates to an electronic device with a communication capability to write and read data to and from a contactless IC (integrated circuit) card using the technique of electromagnetic-inductive coupling.

This application claims the priority of the Japanese Patent Application No. 2002-284177 filed on Sep. 27, 2002 and No. 2003-025288 filed on Jan. 31, 2003, the entirety of which is incorporated by reference herein.

BACKGROUND ART

Recently, a so-called RFID (radio frequency identification) system using a contactless IC card, IC tag or the like has been introduced into the fields of art such as an automatic ticket checker used in the railway station, security system for checking people going to enter or exit from a building, electronic money system, etc. As schematically illustrated in FIG. 1, the RFID system includes a contactless IC card 100 and a reader/writer 101 to write and read data to and from the IC card 100. The RFID system adopts the theory of electromagnetic induction. A magnetic flux radiated from a loop antenna 102 provided at the reader/writer 101 is coupled by the electromagnetic induction to a loop antenna 103 provided at the IC card 100 to provide communications between the IC card 100 and reader/writer 101.

In the above RFID system, the IC card has not to be inserted into the reader/writer to put metallic contacts into contact with each other as in the conventional contactless IC card systems. Therefore, data can be written to, and read from, the IC card easily and quickly.

In the above RFID system, the electromagnetic field radiated from the reader/writer 101 provides a necessary power to the IC card 100 by electromagnetic induction and thus any power source such as a battery or cell has not to be provided in the IC card. Therefore, the RFID system can be constructed to be simpler and there can be provided an IC card lower in price and higher in reliability.

In the above RFID system, the loop antenna 102 provided at the reader/writer 101 should be able to radiate an electromagnetic field having a certain degree of magnetic strength in order to assure a satisfactory range of communications between the IC card 100 and reader/writer 101.

Generally, the loop antenna 102 for the reader/writer 101 includes a loop coil 200 formed from a plane winding of a conductor as shown in FIG. 2. The loop coil 200 is formed from winding sections disposed opposite to each other across the center of the loop coil 200. The winding sections are equal in interval and width to each other. It should be noted that actual examples of the loop antenna of this type are found in the Japanese Published Unexamined Patent Application No. 1998-144048 in which there is disclosed an antenna 90 provided at a main unit and connected to a reader/writer module 91, and also in the Japanese Published Unexamined Patent Application No. 2001-331829 in which there are disclosed antennas AG1, AG2 and AG3 of a reader/writer RW 2.

Therefore, in the above symmetric loop antenna 102 for the reader/writer 101, the magnetic field is distributed symmetrically as shown in FIG. 3.

FIG. 4 shows the dependence upon the card position of the strength of a current induced by the loop antenna 102 to the IC card 100. As shown, two communication areas $S_1'$ and $S_2'$ will be formed in positions, respectively, opposite to each other across the center of the loop coil 200. More particularly, the communication area $S_1'$ assures an ideal magnetic coupling. Namely, magnetic fields developed at four sides of the loop antenna 102 at the reader/writer 101 are inductively coupled to those developed at four sides of the loop antenna 103 at the IC card 100, opposite to the four sides, respectively, of the loop antenna 102. Outside the communication area $S_1'$, there is an area where magnetic fields crossing the loop antenna 103 at the reader/writer 101 cancel each other in a central area where the magnetic fields developed around the loop antenna 102 at the reader/writer 101 are inverted in direction. In this outer area, the induced current will have a lower level than the necessary level for the communications. Outside the above outer area, there is the communication area $S_2'$ where only one of the four sides of the loop antenna 102 at the reader/writer 101 is coupled to one of the four sides of the loop antenna 103 at the IC card 100. Therefore, the communication area $S_2'$ is narrower than the communication area $S_1'$, and the induced current in this communication area $S_2'$ is smaller than that in the communication area $S_1'$.

Note that in FIG. 4, the origin "0" of the horizontal axis indicates the center of the loop antenna 102 at the reader/writer 101 and the positive-going direction indicates a direction from the center (origin "0") toward outside of the IC card 100. The vertical axis indicates the strength of the current electromagnetically induced in the loop antenna 103 at the IC card 100 under the action of the magnetic field in the loop antenna 102 at the reader/writer 101. Communications are possible in an area where the strength of the induced current has a value larger than a value indicated with a dashed line s' in FIG. 4.

Note here that when the communication area $S_1'$ is continuously wider as far as possible outwardly of a point, namely, the origin "0", where the center of the loop antenna 103 at the IC card 100 coincides with that of the loop antenna 102 at the reader/writer 101, the RFID system will be easier to use.

That is to say, in a direction the origin "0" toward outside of the above conventional loop coil 200, the communication area $S_1'$ is followed by a non-communication area once, and then by the communication area $S_2'$. It is desirable from the practical point of view that no non-communication area should exist between the communication areas $S_1'$ and $S_2'$ or only the communication area $S_1'$ should spread.

The above loop antenna 102 for the reader/writer 101 should not be installed as it is to a housing made of an Mg alloy or the like because it will not normally operate due to the influence of an eddy current or the like. In case the loop coil 200 is installed in a metallic housing 300 as shown in FIG. 5, a magnetic sheet 301 is interposed between the metallic housing 300 and loop coil 200 with a sheet 302 of polycarbonate or the like being disposed as a protective material over the loop coil 200. Also in this case, the loop antenna 102 for the reader/writer 101 cannot efficiently radiate any electromagnetic field to the IC card 100, and thus the range of communications between the IC card 100 and reader/writer 101 is narrow.

Further, in case a resin-made housing 400 is used to house the loop coil 200 as shown in FIG. 6, a spacer 402 has to be disposed between an electric circuit board 401 inside the resin-made housing 400 and the loop antenna 102 to prevent any noise from being electromagnetically induced, which will lead to an increased thickness of the housing 400. Moreover, the conventional loop antenna 102 for the reader/writer 101 is nearly equal in dimensions to the loop antenna 103 at the IC card 100. The conventional loop antenna 102 of this type for the reader/writer 101 can hardly be smaller and thinner.

Although the conventional RFID system has the above technical problems, the aforementioned reader/writer 101 is installed on a resin-made or metallic housing of some small portable-type electronic devices for example. In this case, the loop antenna 102 for the reader/writer 101 should be formed equal or smaller in outside dimensions to or than, and thinner than, the IC card 100.

Different from the stationary electronic devices, the small portable-type electronic device is limited in size to assure its portability. Therefore, any well worked-out disposition of the loop coil in a space inside the housing will not effectively solve the problems in assuring a space for the loop coil installed inside the housing, that is enough to inhibit the electromagnetic field radiated from the loop antenna 102 from adversely affecting the electronic circuit board and the like disposed near the inner wall of the housing as well as to prevent the metallic housing from affecting the loop antenna 102. Hence, there is a demand for a new method of preventing the metallic housing from affecting on the loop antenna 102 and the electromagnetic field radiated from the loop antenna 102 itself from affecting the electronic circuit board and the like.

Also, the small portable-type electronic device should be operable with a less power consumption. Therefore, the drive current for the loop antenna 102 cannot be smaller, and thus the loop antenna 102 has to be formed to have a new, high efficiency construction which assures a sufficient magnetic field strength even with a small drive current.

Further, because of the limited location of installation and geometric relation of the reader/writer 101 with the location of any other functional part such as a keyboard or the like as a user's operation unit, a desired position of transmission and reception of the R/W 101 cannot always be at the center of the loop antenna 102, which will not meet a demand peculiar to the small portable-type electronic device, such as a requirement for a freedom of setting the transmission/reception position to attain an easier operability of the electronic device itself.

Note here that besides the above working-out of the spatial disposition, there have been proposed techniques of preventing the metallic housing from affecting the loop antenna 102, including, as typical ones, an IC tag antenna made of a plate-shaped magnetic material to suppress the influence of a metallic member (as in the Japanese Published Unexamined Patent Application No. 2001-331772) and a card loader antenna made of a magnetic material to suppress the influence of a metallic member by deflecting the magnetic field in the antenna (as in the Japanese Published Unexamined Patent Application No. 2002-123799).

Any of the aforementioned conventional techniques can hardly implement any compact and thin loop antenna optimum for a R/W in a small portable-type electronic device material- and space-limited in power consumption and location of installation of the loop antenna.

DISCLOSURE OF THE INVENTION

Accordingly, the present invention has an object to overcome the above-mentioned drawbacks of the related art by providing an improved and novel electronic device having a function of communication.

The present invention has another object to provide a communication-capable electronic device that can send and receive write and/or read information more accurately with suppression of an influence of a material used to form a housing included in the device body.

The present invention has another object to provide a communication-capable electronic device formed smaller and higher in performance.

The above object can be attained by providing a communication-capable electronic device including according to the present invention:

a housing for accommodating parts of the device; and a communication antenna disposed inside the housing to make communications with a communication-capable IC card having a loop antenna built therein, the communication antenna being disposed in a location where a part of the antenna incorporated in the IC card is to face a part of the communication antenna, while the rest of the antenna in the IC card will not face that part of the communication antenna, when the IC card is located near the housing.

In the above electronic device according to the present invention, the housing is made of a metal and has at least the communication antenna disposed therein, the width of an area thereof a part of the IC card faces being smaller than at least the long-side length of the IC card formed to have a rectangular shape composed of a pair of short sides and a pair of long sides.

The housing of the electronic device according to the present invention has provided thereon an index to indicate the position of the antenna disposed inside the housing.

In an area, facing the IC card, of the housing, there is provided a positioner to determine a position where the IC card faces the housing.

In the electronic device according to the present invention, when the communication-capable IC card having the antenna built is located near the housing, that is, when it is placed on the housing, only a part of the antenna of the antenna built in the IC card faces a part of the communication antenna at the housing to prevent any degradation of the communication characteristic for sending and receiving information to be written to or read from the IC card.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIG. 8 is a plan view of a plane asymmetric loop antenna.

FIG. 9 schematically illustrates the magnetic field distribution around the cubic asymmetric loop antenna.

FIG. 10 is a plan view of the cubic asymmetric loop antenna.

FIG. 11 schematically illustrates the magnetic field distribution around the cubic asymmetric loop antenna.

FIG. 12 shows a characteristic curve showing the relation between the specific permeability of the magnetic sheet and range of communications.

FIG. 13 shows a characteristic curve showing the relation between the product Ms·t of saturation magnetization Ms and thickness t and distance of communication.

FIG. 18 is a plan view of a communication terminal device according to the present invention.

FIG. 24A is a plan view of the magnetic sheet, and FIG. 24B is a sectional view of the magnetic sheet.

FIG. 25 is a plan view of the loop coil.

FIG. 26 is a plan view of the cubic asymmetric loop antenna.

BEST MODE FOR CARRYING OUT THE INVENTION

The present invention will be described in detail concerning the communication-capable electronic device as the embodiment thereof with reference to the accompanying drawings.

Figure 7:
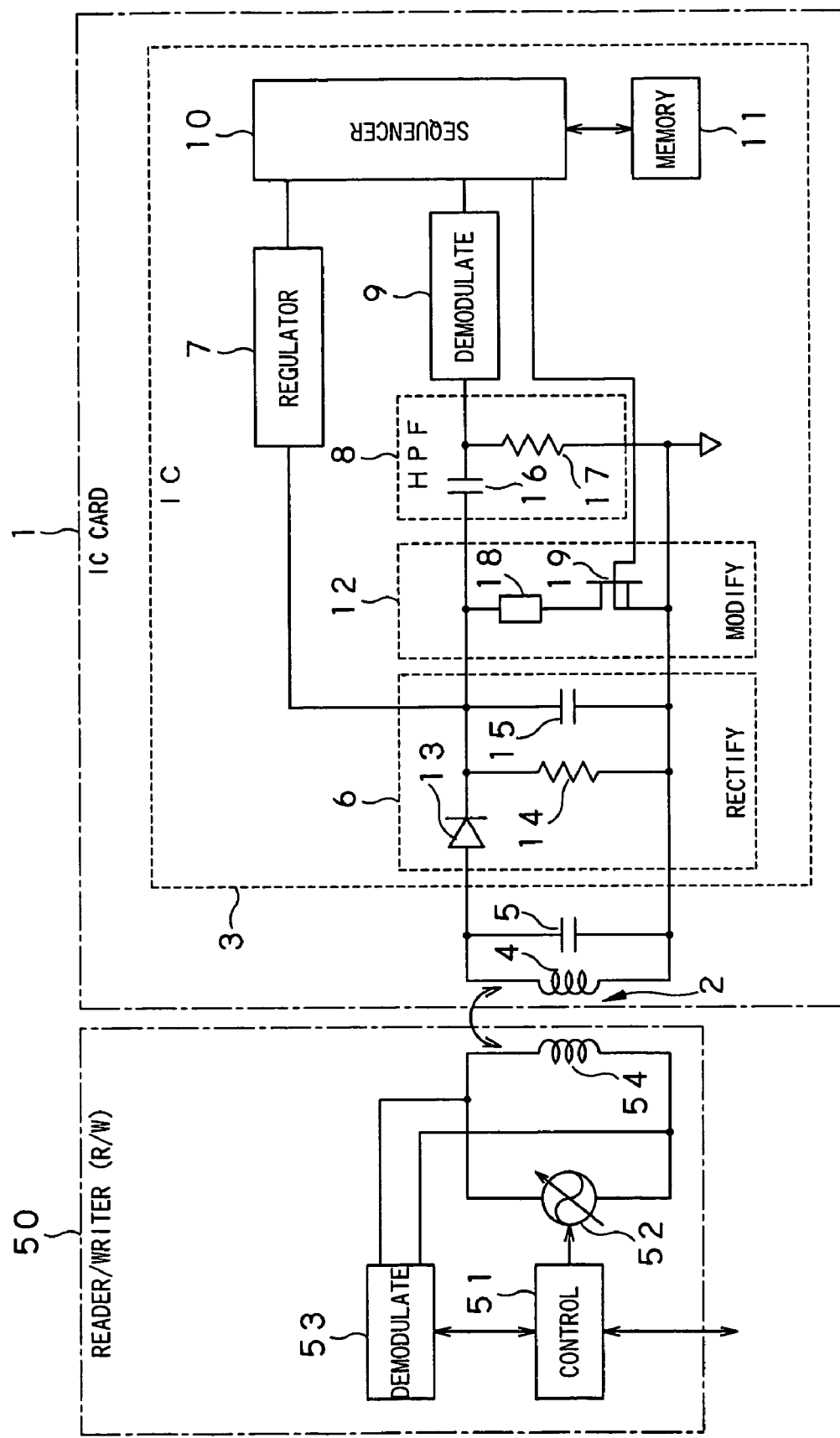
FIG. 7 is a circuit diagram of an RFID system used in the electronic device according to the present invention.

First, there will be explained an antenna device used in the communication-capable electronic device em according to the present invention. The antenna device is used in an RFID system constructed as shown in FIG. 7. As shown in FIG. 7, the RFID system is composed of a contactless IC card 1, and a reader/writer (will be referred to as "R/W" hereunder) 50 to write and read data to and from the IC card 1.

The IC card 1 is of a so-called battery-less type compliant with ISO 7810, for example. Namely, it has no power source such as a battery or cell. The IC card 1 is formed rectangular to have the same size as the so-called credit card, namely, it is palm-sized. Namely, the short and long sides of the rectangle are such that the IC card can be held on the palm. The IC card 1 has provided on a circuit board built therein a loop antenna 2 that couples with an electromagnetic field to send and receive data, an IC (integrated circuit) 3 having integrated therein electronic circuits that make various operations for writing and reading data, and a memory.

The loop antenna 2 includes a loop coil 4 formed from a plane winding of a conductor, and forms a resonant circuit along with a capacitor 5 connected in parallel therewith. The loop antenna 2 couples with an electromagnetic field radiated from a loop antenna provided at an R/W 50 that will be explained in detail later, converts the electromagnetic field into an electrical signal, and supplies the signal to the IC 3.

The IC 3 includes a rectification circuit 6 to rectify and smooth the electrical signal supplied from the loop coil 4, a regulator 7 to converter the electrical signal supplied from the rectification circuit 6 into a DC power, an HPF (high-pass filter) 8 to extract a high-frequency component from the electrical signal supplied from the rectification circuit 6, a demodulation circuit 9 to demodulate the high-frequency component supplied from the HPF 8, a sequencer 10 to control data write and read correspondingly to data supplied from the demodulation circuit 9, a memory 11 to store the data supplied from the demodulation circuit 9, and a modulation circuit 12 to modulate data to be sent by the loop antenna 4.

The rectification circuit 6 is composed of a diode 13, resistor 14 and a capacitor 15. Of these parts, the diode 13 is connected at the anode thereof to one end of each of the loop coil 4 and capacitor 5 and at the cathode to one end of the resistor 14 and capacitor 15, the resistor 14 and capacitor 15 are connected at the other ends thereof to the other ends of the loop coil 4 and capacitor 5. The rectification circuit 6 outputs the electrical signal resulted by the rectification and smoothing the electrical signal supplied from the loop coil 4 to the regulator 7 and HPF 8.

The regulator 7 is connected to the cathode of the diode 13 in the aforementioned rectification circuit 6 and one end of each of the resistor 14 and capacitor 15. The regulator 7 stabilizes the electrical signal supplied from the rectification circuit 6 by preventing the signal from being varied in voltage due to some data component, and supplies the signal as a DC power to the sequencer 10. Thus, it is possible to suppress a voltage variation caused by a movement of the IC card 1, a voltage variation caused by a change of the power consumption inside the IC card 1, etc. If not suppressed, such voltage variations will lead to a malfunction or the like of the sequencer 10.

The HPF 8 is composed of a capacitor 16 and resistor 17. It extracts the high-frequency component from the electrical signal supplied from the aforementioned rectification circuit 6, and supplies the signal to the demodulation circuit 9.

The demodulation circuit 9 is connected to the other end of a capacitor 16 of the HPF 8 and one end of the resistor 17. It demodulates the high-frequency signal supplied from the HPF 8, and outputs the demodulated signal to the sequencer 10.

The sequencer 10 incorporates a ROM (read-only memory) and RAM (random-access memory), and is connected to the aforementioned demodulation circuit 9. The sequencer 10 stores a signal (command) supplied from the demodulation circuit 9 into the RAM, analyzes the command according to a program held in the ROM, and reads data from the memory 11 as necessary on the basis of the result of analysis or writes data supplied from the demodulation circuit 9 into the memory 11. The sequencer 10 generates a response signal responsively to the command supplied, and supplies the signal to the modulation circuit 12.

The memory 11 is a non-volatile memory such as an EEPROM (electrically erasable programmable read-only memory) needing no power for holding data, and connected to the aforementioned sequencer 10. The memory 11 stores data supplied from the demodulation circuit 9 according to the result of analysis from the sequencer 10.

The modulation circuit 12 is formed from a series circuit composed of an impedance 18 and an EFT (field effect transistor) 19. The impedance 18 is connected at one end thereof to the cathode of the diode 13 in the aforementioned rectification circuit 6, and at the other end to the drain of the FET 19. The FET 19 is connected at the source thereof connected to the ground potential point, and at the gate to the sequencer 10. The modulation circuit 12 is connected in parallel to the loop coil 4 included in the aforementioned resonant circuit and controls the FET 19 to make a switching operation according to a signal supplied from the sequencer 10 in order to change the load of the impedance 18 to the loop coil 4. That is, the modulation circuit 12 adopts the so-called additional modulation method.

The R/W 50 includes a control circuit 51 to control data to be sent and received, a modulation circuit 52 and demodulation circuit 53, for data modulation and demodulation, respectively, and a loop antenna 54 that couples with an electromagnetic field to send and receive data.

In the R/W 50, the control circuit 51 generates a variety of control signals according to an external instruction and a program held therein, for example, in order to control the modulation circuit 52 and demodulation circuit 53, and also generates send data corresponding to an instruction and supplies the data to the modulation circuit 52. Also, the control circuit 51 generates a reproduce signal according to response data from the demodulation circuit 53, and outputs the data to outside.

In the modulation circuit 52, a transmitter modulates the send data supplied from the control circuit 51, and supplies the modulated signal to the loop antenna 54.

The demodulation circuit 53 demodulates the modulated wave supplied from the loop antenna 54, and supplies the demodulated data to the control circuit 51.

The loop antenna 54 also includes a loop coil formed from a plane winding of a conductor. It radiates an electromagnetic field corresponding to a modulate wave supplied from the modulation circuit 52, and detects a variation of the load to the loop coil 4 at the IC card 1. It should be noted that the loop antenna 54 has a resonance capacitor connected in parallel or in series thereto depending upon an antenna driving method adopted in the R/W 50 as the case may be.

In the RFID system constructed as above, when the IC card 1 is given an instruction for writing a predetermined data, the control circuit 51 in the R/W 50 generates a write command signal on the basis of the instruction, and also generates send data (write data) corresponding to the instruction, and supplies the data to the modulation circuit 52. The modulation circuit 52 modulates the amplitude of oscillation signal on the basis of the supplied signal, and supplies the modulated signal to the loop antenna 54. The loop antenna 54 will thus radiate an electromagnetic wave corresponding to the supplied modulated signal.

Note here that the resonant frequency of the resonant circuit composed of the loop coil 4 and capacitor 5 included in the IC card 1 is set to 13.56 MHz, for example, as a value corresponding to the oscillation frequency that is a carrier frequency from the R/W 50. The oscillation circuit receives the radiated electromagnetic field by oscillation, converts it into an electrical signal, and then supplies the electrical signal to the IC 3. The electrical signal resulted from the electromagnetic field is supplied to the rectification circuit 6, rectified and smoothed by the rectification circuit 6 and then supplied to the regulator 7. The regulator 7 suppresses the voltage variation (data component) of the electrical signal supplied from the rectification circuit 6, and supplies the electrical signal as a DC power to the sequencer 10 after the electrical signal is stabilized.

The signal rectified and smoothed by the rectification circuit 6 is supplied to the HPF 8 via the modulation circuit 12 where a high-frequency component will be extracted from the signal, and then the high-frequency signal is supplied to the demodulation circuit 9. The demodulation circuit 9 demodulates the supplied high-frequency signal and supplies the demodulated signal to the sequencer 10. The sequencer 10 stores the signal (command) supplied from the demodulation circuit 9 into the RAM, analyzes the signal according to the program held in the ROM, and writes write data supplied from the demodulation circuit 9 into the memory 11 on the basis of the result of analysis.

On the other hand, in case the signal (command) supplied from the demodulation circuit 9 is a read instruction, the sequencer 10 will read data corresponding to the read instruction from the memory 11. Also, the sequencer 10 switches the FET 19 in the modulation circuit 12 correspondingly to the read data. That is, in the modulation circuit 12, when the FET 19 is turned on, the loop coil 4 is connected in parallel to the impedance 18. When the FET 19 is turned off, the parallel connection between the impedance 18 and loop coil 4 is broken. As a result, the impedance of the loop antenna 54 at the R/W 50, magnetically connected to the loop antenna 2 at the IC card 1, varies correspondingly to the read data. Therefore, the terminal potential of the loop antenna 54 will vary correspondingly to the impedance variation, and the R/W 50 is thus enabled to receive the read data since the variation is demodulated by the demodulation circuit 53.

As above, communications are made between the IC card 1 and R/W 50, and the R/W 50 can thus write or read data to or from the IC card 1 in a non-contact manner or by radio.

Note here that the aforementioned loop antenna 54 at the R/W 50 may be an antenna device constructed according to the present invention as shown in FIG. 8. The antenna device is generally indicated with a reference 80. As shown, the antenna device 80 includes a loop coil 81 for inductive coupling of an electromagnetic field, and a magnetic sheet 82 disposed to face the main side of the loop coil 81, opposite to the main side facing the IC card 1.

The loop coil 81 is formed by etching or other processing of an electroconductive metal foil of electrolytic copper or the like formed on both sides of an insulation film or substrate 83 made of a flexible film of polyimide or mica. It should be noted that the method of forming the loop coil 81 is not limited to the above one but the loop coil 81 may be formed by printing an electroconductive paste such as a silver paste on the film or substrate 83 to form a conductor pattern that provides the loop coil 81 or by sputtering a metal target to form, on the substrate 83, a conductor pattern that provides the loop coil 81.

Also, in the loop coil 81, the winding sections thereof opposite to each other across the center of the loop coil 81 are disposed asymmetrically to be different in interval and width from each other in one direction. That is, the loop coil 81 includes a lower winding section 81a being smaller in interval and width in one direction, that is, a vertical direction indicated with an arrow Z in FIG. 8, and an upper winding section 81b being larger in interval and width in that direction of arrow Z.

On the other hand, the magnetic sheet 82 is formed to have a rectangular shape larger than the loop coil 81 to cover the latter completely within the main side thereof. This antenna device 80 has the magnetic sheet 82 attached to the main side of the loop coil 81, opposite to the main side facing the IC card 1.

Figure 3:
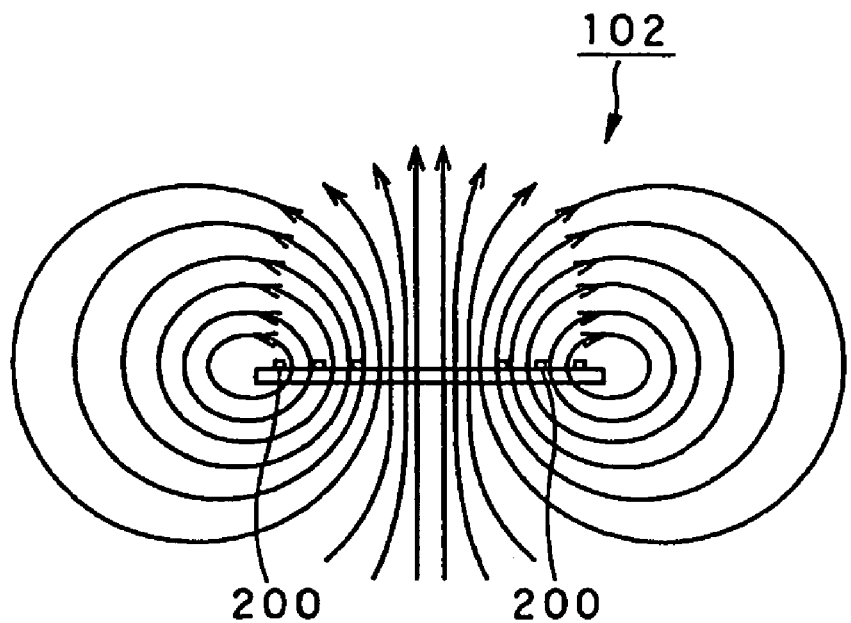
FIG. 3 schematically illustrates the magnetic field distribution around the conventional R/W loop antenna.
Figure 4:
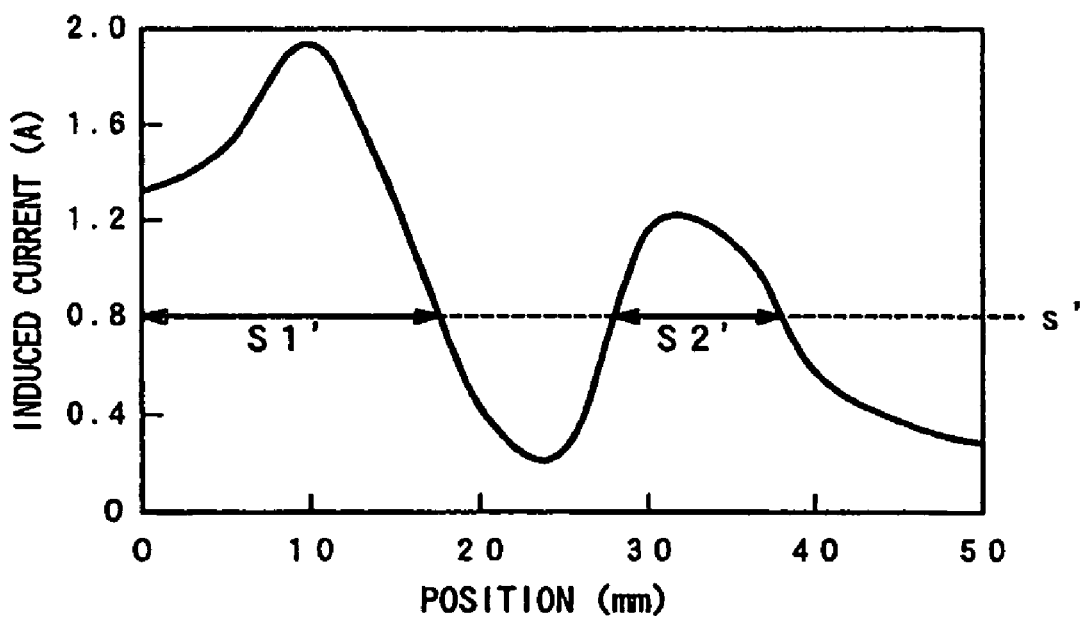
FIG. 4 shows a characteristic curve of a performance of communications between the conventional R/W loop antenna and IC card.
Figure 5:
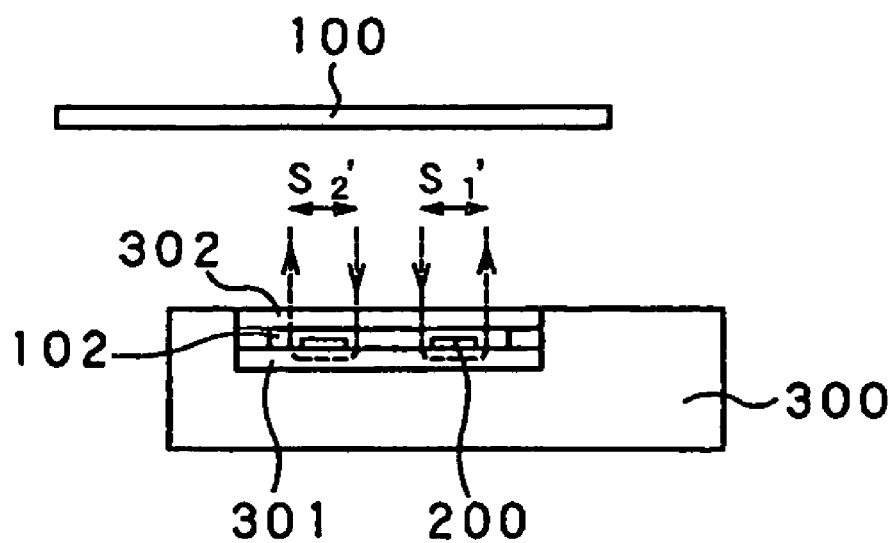
FIG. 5 schematically illustrates the magnetic field distribution around the conventional R/W loop antenna disposed in the metallic housing.
Figure 6:
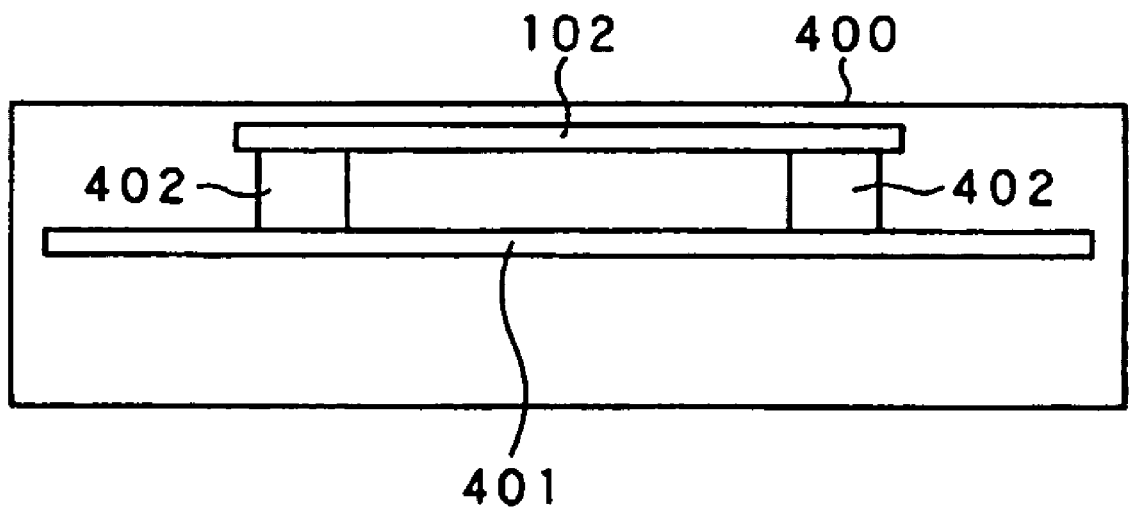
FIG. 6 is a sectional view of the conventional R/W loop antenna disposed in the resin-made housing.

In this case, the distribution of a magnetic field around the antenna device 80 in one direction indicated with the arrow Z in FIG. 8 is enhanced at the upper winding section 81b of the loop coil 81, larger in interval and width as shown in FIG. 9. That is, different from the magnetic field distribution being symmetric as shown in FIG. 3, the distribution of magnetic field around the antenna device 80 is asymmetric.

In the antenna device 80 according to the present invention, since the loop coil 81 is formed asymmetric and the distribution of a magnetic field radiated from the loop coil 81 is controlled, it is possible to provide a wider range of communications between the IC card 1 and R/W 50 and also shift the position of communication in one direction. Also, since the loop coil 81 can be formed smaller than the loop coil 4 at the IC card 1, the antenna device 80 can be formed further smaller.

The antenna device 80 according to the present invention has the magnetic sheet 82 disposed to face the main side of the loop coil 81, opposite to the main side facing the IC card 1, and thus can enhance only the magnetic field distribution on the main side, facing the IC card 1, of the loop coil 81. Therefore, since the magnetic field intensity is increased, the antenna device 80 according to the present invention can provide a further increased range of communications between the IC card 1 and R/W 50.

The aforementioned loop antenna 54 provided at the R/W 50 may be an antenna device constructed according to the present invention as shown in FIG. 10. The antenna device is generally indicated with a reference 90.

As shown in FIG. 10, the antenna device 90 includes a loop coil 91 for inductive coupling of an electromagnetic field, and a magnetic sheet 92 formed from magnetic sheet portions penetrated through the center of the loop coil 91 and lapped on each other.

The loop coil 91 is formed by etching or other processing of a conductive metal foil of electrolytic copper or the like formed on both sides of an insulation film or substrate 93 made of a flexible film of polyimide or mica. It should be noted that the method of forming the loop coil 91 is not limited to the above one but the loop coil 91 may be formed by printing an electroconductive paste such as a silver paste on the film or substrate 93 to form a conductor pattern that provides the loop coil 91 or by sputtering a metal target to form, on the substrate 93, a conductor pattern that provides the loop coil 91.

Also, in the loop coil 91, the winding sections thereof opposite to each other across the center of the loop coil 91 are disposed asymmetrically to be different in interval and width from each other in one direction. That is, the loop coil 91 includes a lower winding section 91a being smaller in interval and width in one direction, that is, a vertical direction indicated with an arrow Z in FIG. 10, and an upper winding section 91b being larger in interval and width in that direction of arrow Z. Also, the loop coil 91 has formed in the center thereof a through-hole 94 through which the magnetic sheet 92 is penetrated.

On the other hand, the magnetic sheet 92 includes a rectangular portion 92a extended in one direction of the loop coil 91 and wider than the outermost width of the winding section of the loop coil 91, and a rectangular portion 92b extended downward from the bottom center of the wide portion 92a and narrower than the innermost width of the winding section of the loop coil 91 as shown in FIGS. 10 and 11. Namely, the magnetic sheet 92 is formed generally like a letter "T". More specifically, the wide portion 92a of the magnetic sheet 92 is formed to have a rectangular shape larger than the loop coil 91 to cover the upper winding section 91b of the loop coil 91 completely within the main side thereof. On the other hand, the narrow portion 92b of the magnetic sheet 92 is formed to have a rectangular shape sufficiently wide to penetrate through the through-hole 94 in the loop coil 91 and smaller than the loop coil 91 for the lower winding section 91a of the loop coil 91 to be covered completely within the main side thereof.

In the antenna device 90, the magnetic sheet 92 is attached to the loop coil 91 in one direction with the narrow portion 92b thereof being penetrated through the through-hole 94 in the loop coil 91 in a direction from the main side of the loop coil 91, opposite to the main side facing the IC card 1, toward the main side facing the IC card 1. Therefore, at the lower winding section 91a of the loop coil 91 where the winding interval is large, the narrow portion 92b of the magnetic sheet 92 faces, at one main side thereof, the main side of the loop coil 91, facing the IC card 1. At the upper winding section 91b of the loop coil 91 where the winding interval is small, the wide portion 92a of the magnetic sheet 92 faces, at the other main side thereof, the main side of the loop coil 91, opposite to the main side facing the IC card 1.

In this case, the distribution of a magnetic field around the antenna device 90 in the direction of arrow Z in FIG. 10, is asymmetric and enhanced at the upper winding section 91b of the loop coil 91 where the winding interval and width are large, as shown in FIG. 11.

In the above antenna device 90, since the loop coil 91 is formed asymmetric and the distribution of a magnetic field radiated from the loop coil 91 is controlled, it is possible to provide a wider range of communications between the IC card 1 and R/W 50 and also shift the position of communication in one direction. Also, since the loop coil 91 can be formed smaller in size than the loop coil 4 at the IC card 1, the antenna device 90 can be formed further smaller.

In the antenna device 90, at the lower winding section 91a of the loop coil 91 where the winding interval is small, the magnetic sheet 92 faces, at the narrow portion 92b thereof, the main side of the loop coil 91, facing the IC card 1. Also, at the upper winding section 91b of the loop coil 91 where the winding interval is large, the magnetic sheet 92 faces, at the wide portion 92a thereof, the main side of the loop coil 91, opposite to the main side facing the IC card 1. Thus, it is possible to enhance only the magnetic field distribution around the upper winding section 91b, on the main side facing the IC card 1, of the loop coil 91 where the winding interval and width are large. Also, in the antenna device 90, since the magnetic field strength in the upper winding section 91b of the loop coil 91 where the winding interval and width are large is enhanced, it is possible to provide a largely widened range of communications between the IC card 1 and R/W 50 in one place.

Note here that in the aforementioned antenna devices 80 and 90, the range of communications between the IC card 1 and R/W 50 can be widened by selecting, for the magnetic sheets 82 and 92, an effective specific permeability $\mu'$ of 20 or more with a carrier frequency in the direction of the surface of the magnetic sheet and a product Ms·t of saturation magnetization Ms and thickness t of 6 emu/cm$^2$ or more.

For selection of the above specific permeability $\mu'$ and product Ms·t of saturation magnetization Ms and thickness t, the relation between the effective specific permeability $\mu'$ of the magnetic sheets 82 and 92 and the range of communications was examined with the carrier frequency. The examination results are shown in FIG. 12. As will be known from the characteristic curve in FIG. 12, the specific permeability $\mu'$ of the magnetic sheets 82 and 92 should preferably be 20 or more to provide a wider range of communications of the antenna device 80 and 90, and more preferably be 30 or more to further widen the range of communications between the IC card 1 and R/W 50.

Also, the relation between the product Ms·t of saturation magnetization Ms and thickness t of the magnetic sheets 82 and 92 and the distance of communication was examined. The examination results are shown in FIG. 13. As will be known from the characteristic curve in FIG. 13, the product Ms·t of saturation magnetization Ms and thickness t of the magnetic sheets 82 and 92 should preferably be 6 emu/cm$^2$ or more to increase the distance of communication of the antenna device 80 and 90, and more preferably be 10 emu/cm$^2$ or more to further increase the range of communications. The magnetic sheets 82 and 92 should have a coercive force Hc of 100 e or less.

The aforementioned antenna devices 80 and 90 is characterized in that the specific permeability $\mu'$, and the product Ms·t of saturation magnetization Ms and thickness t, of the magnetic sheets 82 and 92 are set in accordance with a necessary range of communications. By optimizing the specific permeability $\mu'$, and the product Ms·t of saturation magnetization Ms and thickness t, of the magnetic sheets 82 and 92, it is possible to provide a wider range of communications between the IC card 1 and R/W (reader/writer) 50.

In these antenna devices 80 and 90, since the loop coils 81 and 91 can be formed smaller in size than the loop coil 4 at the IC card 1 by improving the performance of communications, the entire device such as an R/W or the like using the aforementioned antenna device 80 or 90 can be reduced in thickness to less than 1 mm and can thus be formed smaller and thinner.

Note that in the aforementioned antenna devices 80 and 90, the upper and lower winding sections of the loop coils 81 and 91 may not always be different in both interval and width from each other but may be different in-interval alone. Also, the loop coils 81 and 91 are formed asymmetric may be in an arbitrary direction in which the distribution of radiated magnetic field should be widened. For example, the loop coils 81 and 91 may have the upper and lower winding sections thereof disposed asymmetrically to be different in interval and width from each other in a direction perpendicular to the aforementioned direction of arrow Z or in both the direction of arrow Z and direction perpendicular to the direction of arrow Z.

Thus, it is possible to control the distribution of radiated magnetic field around the loop coils 81 and 91 and also arbitrarily adjust the position of the R/W 50 for read from or write to the IC card 1, in a direction in which the loop coils 81 and 91 in the aforementioned antenna devices 80 and 90 are formed asymmetric.

Figure 1:
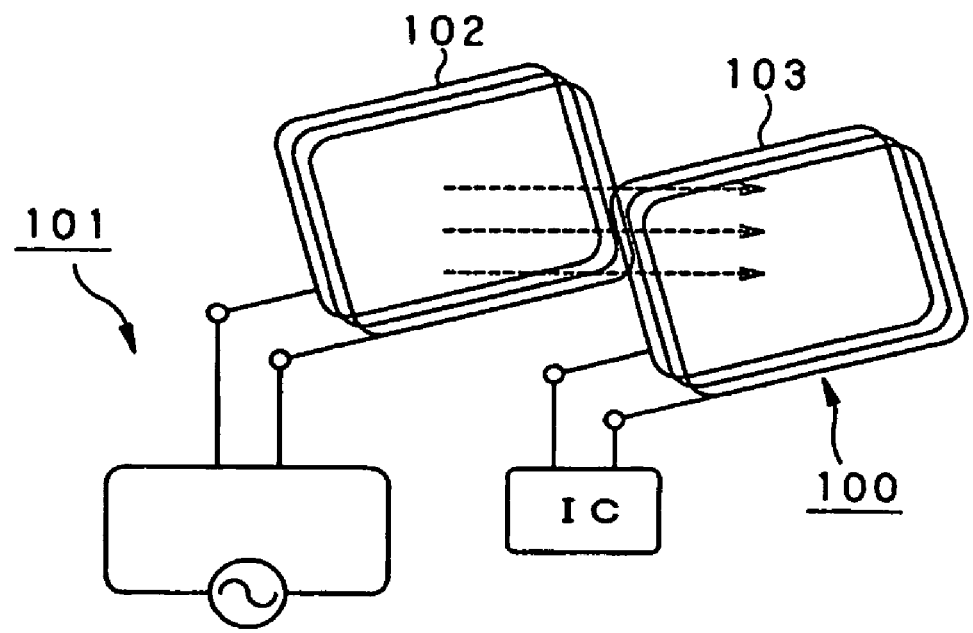
FIG. 1 schematically illustrates the conventional RFID system.
Figure 2:
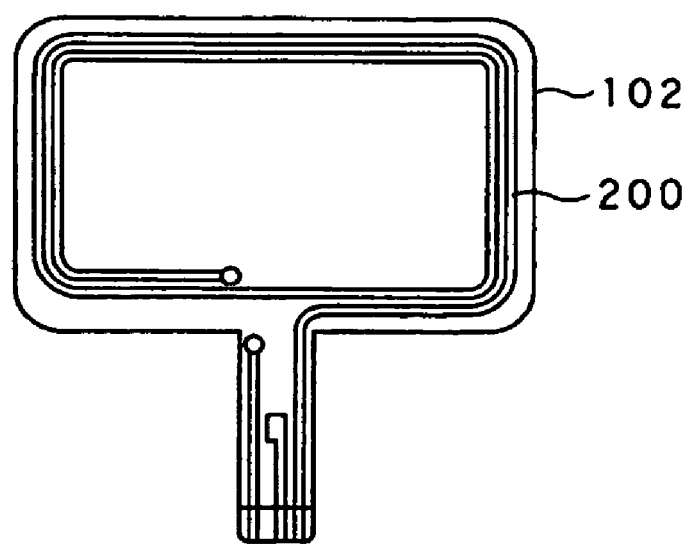
FIG. 2 is a plan view of the conventional R/W (reader/writer) loop antenna.
Figure 14:
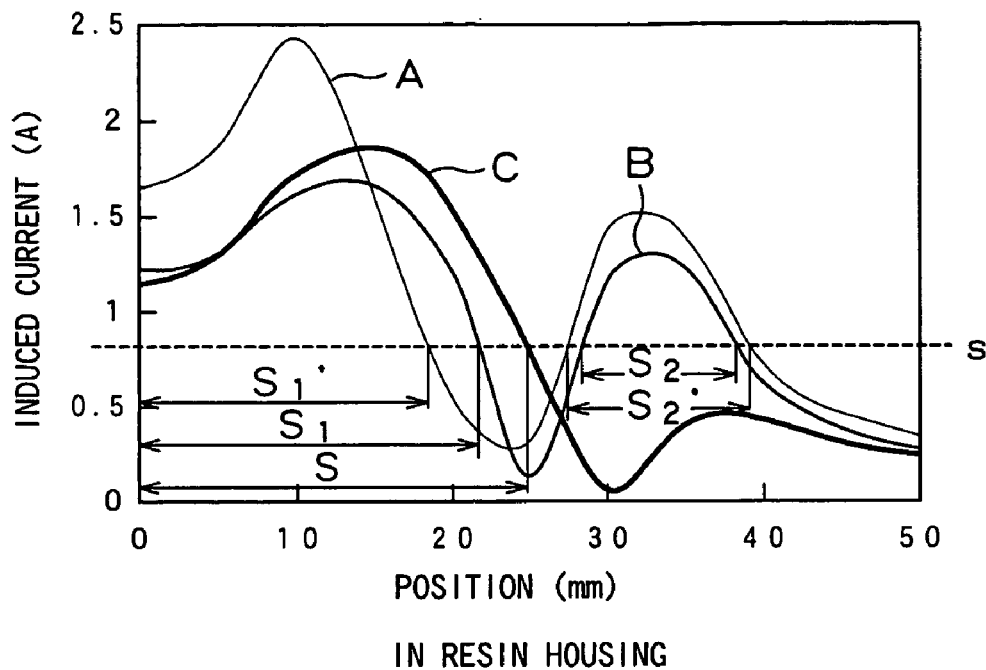
FIG. 14 shows an induced current characteristic curve showing the performance of communications between the IC card and each of the plane symmetric loop antenna, plane asymmetric loop antenna and cubic asymmetric loop antenna, each disposed in a resin-made housing.
Figure 15:
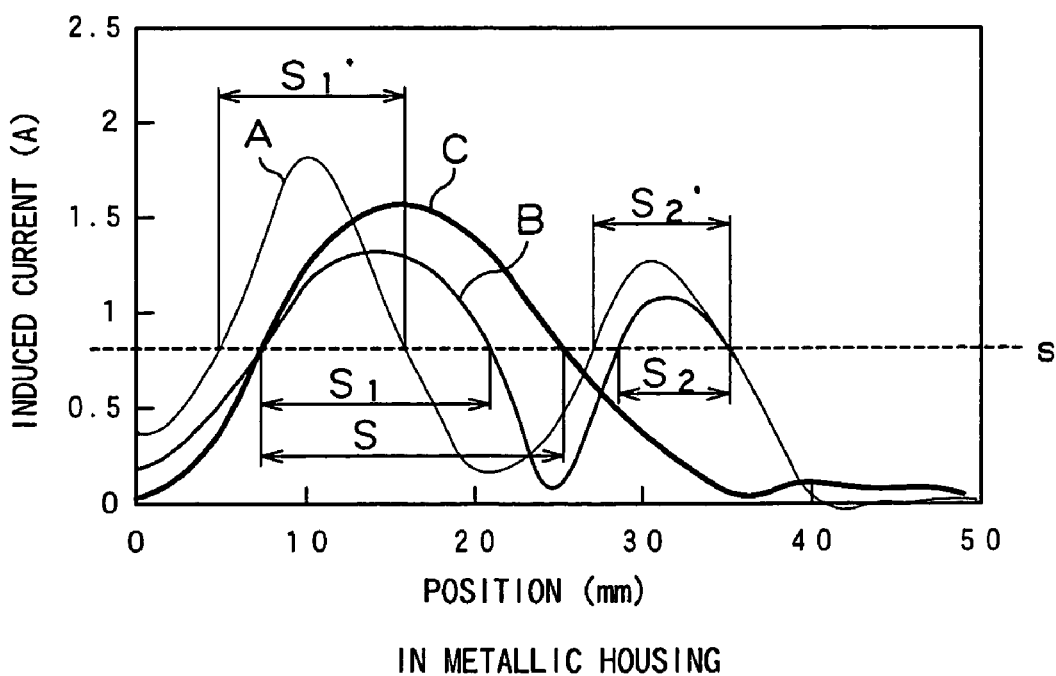
FIG. 15 shows an induced current characteristic curve showing the performance of communications between the IC card and each of the plane symmetric loop antenna, plane asymmetric loop antenna and cubic asymmetric loop antenna, each disposed in a metallic housing.

For comparison in performance of communications among the antenna device 80 constructed as shown in FIG. 8 according to the present invention (will be referred to as "plane asymmetric loop antenna" hereunder), antenna device 90 constructed according to the present invention as shown in FIG. 10 (will be referred to as "cubic asymmetric loop antenna" hereunder) and the conventional antenna device 200 constructed as shown in FIG. 2 (will be referred to as "plane symmetric loop antenna" hereunder), each of them was placed in a resin housing as shown in FIG. 14 and also in a metallic housing as shown in FIG. 15. The results of comparison will be described herebelow.

Note here that also in the conventional antenna device 200 tested as above, the magnetic sheet was disposed at the main side of the loop coil, opposite to the main side facing the IC card 1.

Note that FIGS. 14 and 15 show characteristic curves, respectively, showing the dependence on the card position of the strength of a current induced to the IC card by each of the loop antennas 80, 90 and 200 at the R/W and in which the origin "0" on the horizontal axis indicates the center of each of the loop antennas 80, 90 and 200 at the R/W and the positive-going direction indicates a direction in which the IC card position is shifted outwardly from the origin "0". On the other hand, the vertical axis indicates the strength of a current electromagnetically developed on the loop antenna at the IC card by the magnetic field around each of the loop antennas 80, 90 and 200 at the R/W and communications are possible in an area below a value indicated with a dashed line s in FIGS. 14 and 15. In FIGS. 14 and 15, a thin line A indicates a characteristic of the plane symmetric loop antenna 200, a thicker line B indicates a characteristic of the plane asymmetric loop antenna 80 and a thickest line C indicates a characteristic of the cubic asymmetric loop antenna 90.

Each of the loop antennas 80, 90 and 200 was placed in the resin housing shown in FIG. 14. The conventional plane symmetric loop antenna 200 had formed thereon two communication areas $S_1'$ and $S_2'$ which are narrow as indicated with a reference A in FIG. 14. In the plane asymmetric loop antenna 80, two communication areas $S_1$ and $S_2$ were also formed but the communication area $S_1$ was largely widened in range of communications as indicated with a reference B in FIG. 14. The cubic asymmetric loop antenna 90 had a communication area S formed only in one place near the center thereof and which is widest in comparison with those in the other loop antennas as indicated with a reference C in FIG. 14. The communication area S was only formed in one place because the cubic asymmetric structure of the loop antenna 90 forms only one radiated magnetic field as in the magnetic field distribution shown in FIG. 11. FIG. 9 shows asymmetric bidirectionally radiated magnetic fields.

Each of the loop antennas 80, 90 and 200 was placed in the metallic housing. The range of communications was found narrower under the influence of the metallic housing in all the loop antennas 80, 90 and 200 than that when the loop antenna was placed in the resin housing, as shown in FIG. 15. In the plane asymmetric loop antenna 80 and cubic asymmetric loop antenna 90 according to the present invention, however, the induced current was reduced less than in the conventional plane symmetric loop antenna 200. Namely, in the loop antennas 80 and 90 according to the present invention, the induced current was found less influenced by the material of the housing than in the conventional loop antenna 200.

As will be known from the above, the plane asymmetric loop antenna 80 and cubic asymmetric loop antenna 90 can have the performance of communication thereof improved as the communication areas $S_1$ and $S_2$ are continuously wider outwardly from the origin "0". Especially the cubic asymmetric loop antenna 90 can conveniently be used since the communication area S can be largely widened in one place, and have the impedance thereof lowered than that in the plane asymmetric loop antenna 80, which is advantageously dedicated to a reduced power consumption.

The above plane asymmetric loop antenna 80 and cubic asymmetric loop antenna 90 can be less influenced by the material of the housing for them, and thus they can have the range of communications thereof widened in comparison with the conventional plane symmetric loop antenna 200.

Figure 16:
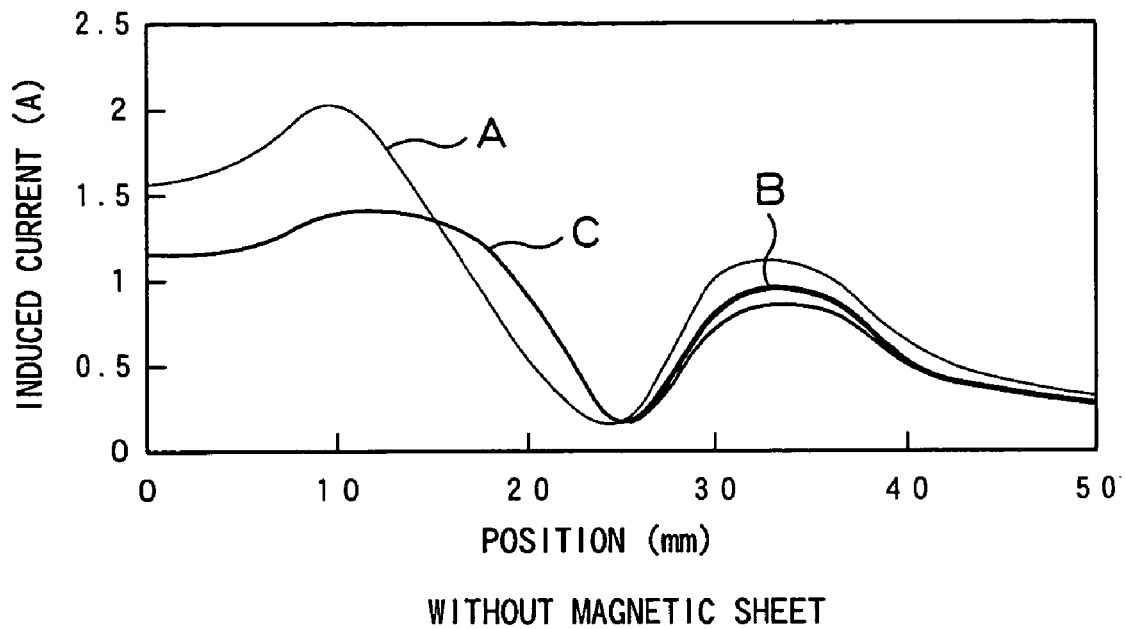
FIG. 16 shows an induced current characteristic curve showing the performance of communications between the IC card and each of the plane symmetric loop antenna, plane asymmetric loop antenna and cubic asymmetric loop antenna, each with no magnetic sheet disposed in combination therewith.
Figure 17:
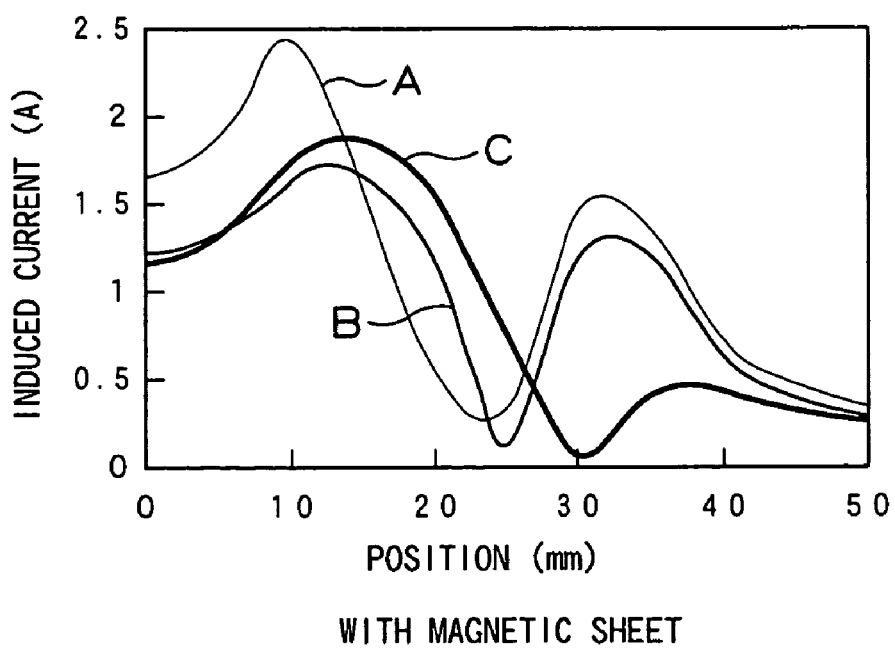
FIG. 17 shows an induced current characteristic curve showing the performance of communications between the IC card and each of the plane symmetric loop antenna, plane asymmetric loop antenna and cubic asymmetric loop antenna, each with a magnetic sheet disposed in combination therewith.

Also, for comparison in performance of communications among the aforementioned loop antennas 80, 90 and 200, they were tested with and without the magnetic sheet disposed to face the main side thereof opposite to the main side facing the IC card. The test results with no magnetic sheet being so disposed are shown in FIG. 16, and those with the magnetic sheet being disposed so are shown in FIG. 17. Note that FIGS. 16 and 17 show characteristic curves, respectively, showing the dependence on the card position of the strength of a current induced to the IC card by each of the loop antennas 80, 90 and 200 at the R/W and in which the origin "0" on the horizontal axis indicates the center of each of the loop antennas 80, 90 and 200 at the R/W and the positive-going direction indicates a direction in which the IC card position is shifted outwardly from the origin "0". On the other hand, the vertical axis indicates the strength of a current electromagnetically developed on the loop antenna at the IC card by the magnetic field around each of the loop antennas 80, 90 and 200 at the R/W. FIG. 16 shows the characteristic found without the magnetic sheet disposed as above, while FIG. 17 shows the characteristic found with the magnetic sheet disposed so. It should be noted that in FIGS. 16 and 17, a thin line A indicates a characteristic of the plane symmetric loop antenna 200, a thicker line B indicates a characteristic of the plane asymmetric loop antenna 80 and a thickest line C indicates a characteristic of the cubic asymmetric loop antenna 90.

As will be known from FIGS. 16 and 17, in all of the loop antennas 80, 90 and 200, the magnetic sheet disposed as above can have a stronger magnetic field, and consequently a stronger induced current, than in case no such magnetic sheet is disposed as above. Thus, the disposition of the magnetic sheet to face the main side of the loop antenna, opposite to the main side facing the IC card increases the magnetic field strength, and hence the strength of a current induced in the loop antenna at the IC card, and thus will be very advantageous in widening the range of communications of the R/W and reducing the power consumption.

FIG. 18 shows a communication terminal device, generally indicated with a reference 70, as an example in which the aforementioned RFID system is applied. The present invention will be described herebelow concerning this communication terminal device 70. The communication terminal device 70 uses the aforementioned cubic asymmetric loop antenna 90 as the loop antenna 54 for the R/W 50.

The communication terminal device 70 is a small electronic device the user can carry such as a so-called PDA (portable digital assistant). The small electronic device has functions such as information communication, storage, imaging, etc., for example, integrated in one module.

As shown, the communication terminal device 70 includes a body block 71 and a display panel block 72. The body block 71 and display panel block 72 are connected by a hinge mechanism 73 that permits the display panel 72 to be opened from and closed to the body block 71. The body block 71 has provided thereon an input block 74 having operation buttons etc. for various operations of the communication terminal device 70, and below the input block 74 the aforementioned cubic asymmetric loop antenna 90 for the R/W 50.

The body block 71 has built therein a microcomputer (CPU) to control each of the components of the communication terminal device 70. The display panel block 72 has provided thereon a display unit 75 formed from a liquid crystal display (LCD) panel to display a user-made operation of the input block 74, data read from the IC card 1 by the R/W 50, etc. under the control of the CPU. The hinge mechanism 73 has a CCD camera 76 installed thereon. By operating the input block 74, an image captured by the CCD camera 76 can be displayed on the display unit 75.

Figure 19:
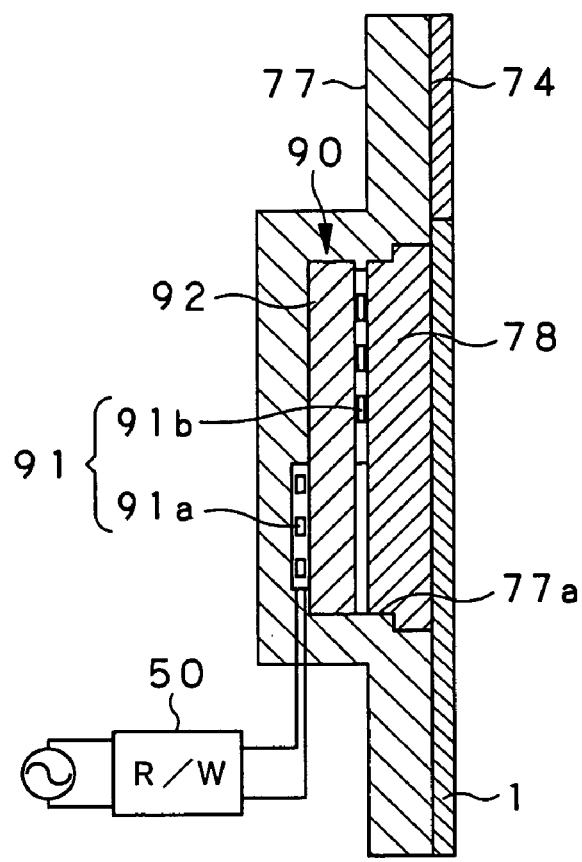
FIG. 19 is a sectional view of the cubic asymmetric loop antenna disposed in the communication terminal device.

To assure a sufficient rigidity of the communication terminal device 70 when it is formed small, lightweight and thin, the communication terminal device 70 includes, as a part of the body block 71, a metallic housing 77 formed from a metal such as Mg alloy or the like, as shown in FIG. 19. The metallic housing 77 has the cubic asymmetric loop antenna 90 disposed therein. The metallic housing 77 has formed therein a concavity 77a for lodging therein the cubic asymmetric loop antenna 90. The antenna 90 placed in the antenna reception concavity 77a is covered with a resin member 78 formed from carbonate or the like and thus protected and prevented from going out of the concavity 77a. It should be noted that the housing in consideration is not limited to the metallic one 77 but may be a non-metallic one formed from a high-rigidity plastic or the like for example.

Also, the loop coil 91 of the cubic asymmetric loop antenna 90 is disposed in the aforementioned one direction thereof in which the IC card 1 is scanned. Thus, the IC card 1 will be scanned starting at the side thereof opposite to the input block 74 of the communication terminal device 70, that is, at the lower winding section 91a of the loop coil 91 of the loop antenna 90 where the winding interval and width are smaller.

Figure 20:
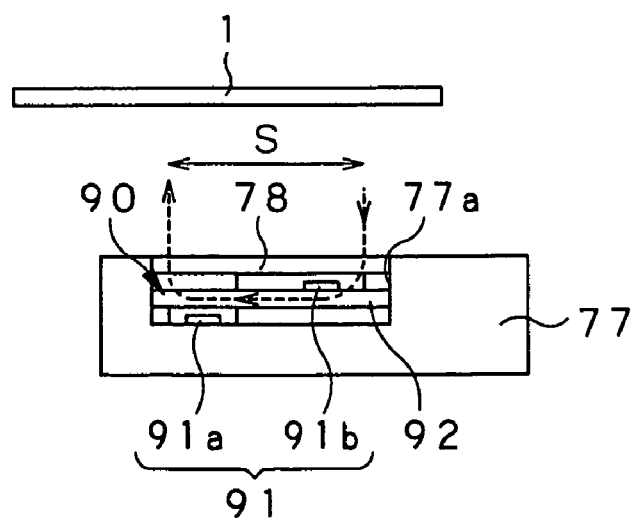
FIG. 20 schematically illustrates a distribution of magnetic field developed around the cubic asymmetric loop antenna disposed in the communication terminal device.

In this case, the magnetic field distribution around the cubic asymmetric loop antenna 90 is enhanced in the upper winding section 91b of the loop coil 91 where the winding interval and width are large, and thus the strength of the magnetic field in the upper winding section 91b is increased, as shown in FIG. 20, so that the range S of communications between the IC card 1 and R/W 50 can be largely widened in one place.

Therefore, in the communication terminal device 70 according to the present invention, the range of communications between the IC card 1 and R/W 50 can be widened, and even when the IC card 1 is scanned starting at the side thereof opposite to the input block 74, data can appropriately be written to or read from the IC card 1 independently of the limited location of the cubic asymmetric loop antenna 90.

Even in case the communication terminal device 70 is placed in the metallic housing 77 included the body block 71, disposition of the cubic asymmetric loop antenna 90 permits to inhibit the range of communications between the IC card 1 and R/W 50 from being decreased.

Further, since the loop antenna 90 at the R/W 50 can be formed smaller than the loop antenna 2 at the IC card 1, the aforementioned communication terminal device 70 itself can be formed to be smaller and consume less power.

Next, an example of the method for manufacturing the aforementioned cubic asymmetric loop antenna 90 installed in the communication terminal device 70 will be described.

Figure 21:
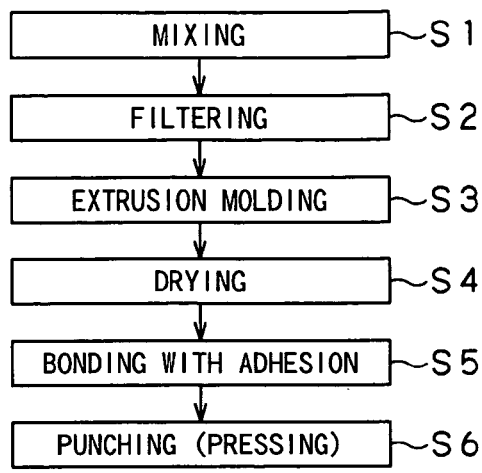
FIG. 21 shows a flow of steps in the process of magnetic sheet manufacture.

The cubic asymmetric loop antenna 90 is made following the procedure shown in the flow chart in FIG. 21.

For manufacture of the cubic asymmetric loop antenna 90, the magnetic sheet 92 is made. For making the magnetic sheet 92, a magnetic paint is prepared first in step S1 by mixing a magnetic powder, solvent and additive in a rubber-resin binder. It should be noted that the magnetic powder is an Fe magnetic material containing Fe in 96 weight percents, Cr in 3 weight percents and Co in 0.3 weight percents and any other magnetic material.

Next in step S2, the magnetic paint is filtered to remove the magnetic powder having a grain diameter larger than a predetermined value from the binder.

Figure 22:
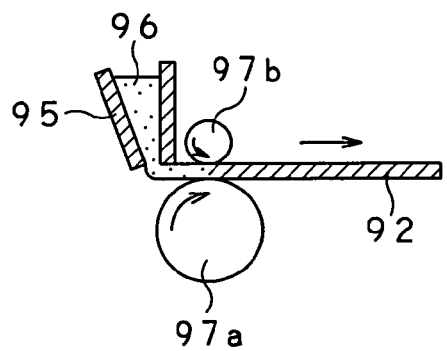
FIG. 22 schematically illustrates an extrusion molding machine.

In step S3, an extrusion molding machine shown in FIG. 22 is used for extruding a magnetic paint 96 in a reservoir 95 through between a pair of rollers 97a and 97b to form a long magnetic sheet 92 having a predetermined thickness.

Next in step S4, the long magnetic sheet 92 is dried and the binder is removed from the long magnetic sheet 92.

Figure 23:
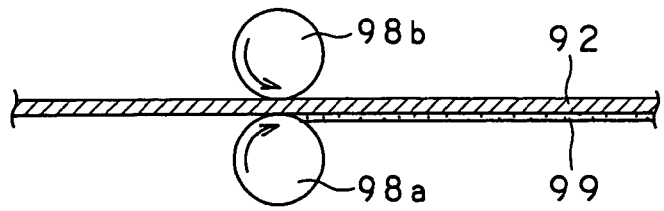
FIG. 23 schematically illustrates a coating machine.

In step S5, an applicator shown in FIG. 23 is used to apply an adhesive 99 to one of the main sides of a portion 92a of the strip-shaped magnetic sheet 92 being moved between a pair of rollers 98a and 98b.

Next in step S6, the strip-shaped magnetic sheet 92 is punched to have a predetermined shape.

With the above operations, the magnetic sheet 92 is formed as shown in FIGS. 24A and 24B.

Next, the aforementioned loop coil 91 is prepared as shown in FIG. 25. As having previously been described, the loop coil 91 is formed by etching or otherwise processing a conductive metal foil of an electrolytic copper or the like formed on both sides of a flexible insulation film or substrate 93 of polyimide, mica or the like. The method of forming the loop coil 91 is not limited to the above-mentioned one but the loop coil 91 may be formed by printing an electroconductive paste such as a silver paste on the film or substrate 93 to form a conductor pattern that provides the loop coil 91 or by sputtering a metal target to form, on the substrate 93, a conductor pattern that provides the loop coil 91. The loop coil 91 has formed in the center thereof the through-hole 94 through which the magnetic sheet 92 is penetrated.

Thereafter, the loop coil 91 and magnetic sheet 92 are attached to each other in one direction with the magnetic sheet 92 being penetrated at the narrow portion 92b thereof through the through-hole 94 in the loop coil 91 as shown in FIG. 26. At this time, the side of the magnetic sheet 92, applied with the adhesive 99, is disposed to face the main side of the loop coil 91, facing the IC card 1. At the lower winding section 91a of the loop coil 91 where the winding interval is small, the narrow portion 92b of the magnetic sheet 92 is attached to the main side of the loop coil 91, facing the IC card 1. Thus, at the upper winding section 91b of the loop coil 91 where the winding interval is large, the wide portion 92a of the magnetic sheet 92 can be attached to the aforementioned antenna reception concavity 77a of the communication terminal device 70.

The aforementioned cubic asymmetric loop antenna 90 can be produced through the above-mentioned processes. Namely, the cubic asymmetric loop antenna 90 has a structure easy to manufacture since the magnetic sheet 92 is penetrated through the through-hole 94 in the loop coil 91, laid on the loop coil 91 and attached with the adhesive 99 to the latter.

Figure 27:
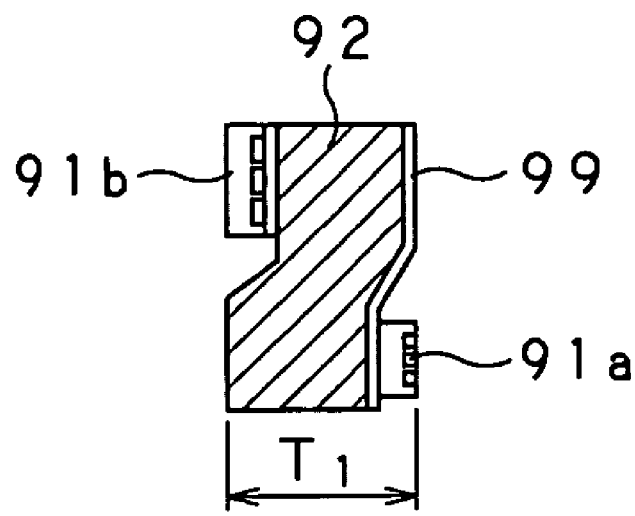
FIG. 27 is a sectional view of a substantial part of the cubic asymmetric loop antenna where the magnetic sheet is soft.
Figure 28:
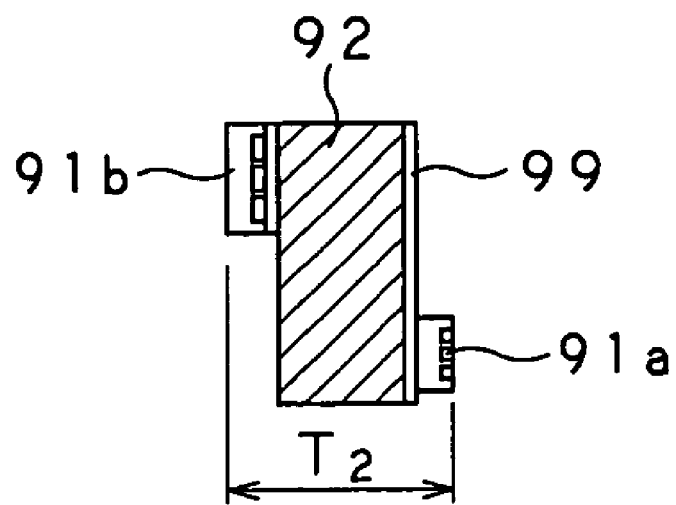
FIG. 28 is a sectional view of the substantial part of the cubic asymmetric loop antenna where the magnetic sheet is hard.

Also, the magnetic sheet 92 should preferably be relatively soft and flexible. In this case, deformation of the magnetic sheet 92 controls the deformation of the lower and upper winding sections 91a and 91b of the loop coil 91, so that the thickness $T_1$ of the entire cubic asymmetric loop antenna 90 can be reduced, as shown in FIG. 27. In case the magnetic sheet 92 is hard, however, the lower and upper winding sections 91a and 91b of the loop coil 91 will be deformed largely, so that the thickness $T_2$ of the entire loop coil 90 will be large, as shown in FIG. 28.

Note here that in an electronic device, such as the aforementioned communication terminal device, for example, incorporating an antenna such as the plane asymmetric loop antenna 80 or cubic asymmetric loop antenna 90 and that sends or receives information to or from a contactless IC card having a loop antenna as above and that makes data communications by the inductive coupling, if the housing forming the device body inside which the loop antenna is provided is made of a magnesium alloy, aluminum or iron, the IC card will not normally operate when it is located in the vicinity of the electronic device. That is, in case each of the communication terminal device and IC card uses a loop antenna formed from an air-core coil, forming the housing of the communication terminal device from a metal will reduce the inductance of the loop antenna at the IC card and thus increase the resonant frequency, so that no normal communications will possibly be done between the communication terminal device and IC card. The inductance reduction harmful to the communications is caused by an eddy current developed in the metallic housing by a radio wave generated by the loop antenna at the IC card. Especially, since the housing as the body of an electronic device like a small portable-type communication terminal device having the aforementioned reader/writer built therein cannot formed large, the loop antenna of an antenna installed inside the housing cannot be formed large, either. As a result, the IC card has to be placed in close contact or proximity to the metallic housing in order to transfer information between the small portable-type communication terminal device and IC card. Thus, the metallic housing will have a considerable influence and the inductance will be considerably reduced, and no communications are possible between the communication terminal device and IC card.

On this account, the present invention proposes to assure a sufficient strength of the housing as the body of a communication terminal device while designing the communication terminal device to be thinner and smaller, to thereby provide a small portable-type communication-capable electronic device capable of positive communications with a communication-capable IC card.

An application of the present invention to a communication terminal device as an electronic device formed small for portability and capable of communications will be described herebelow.

Figure 29:
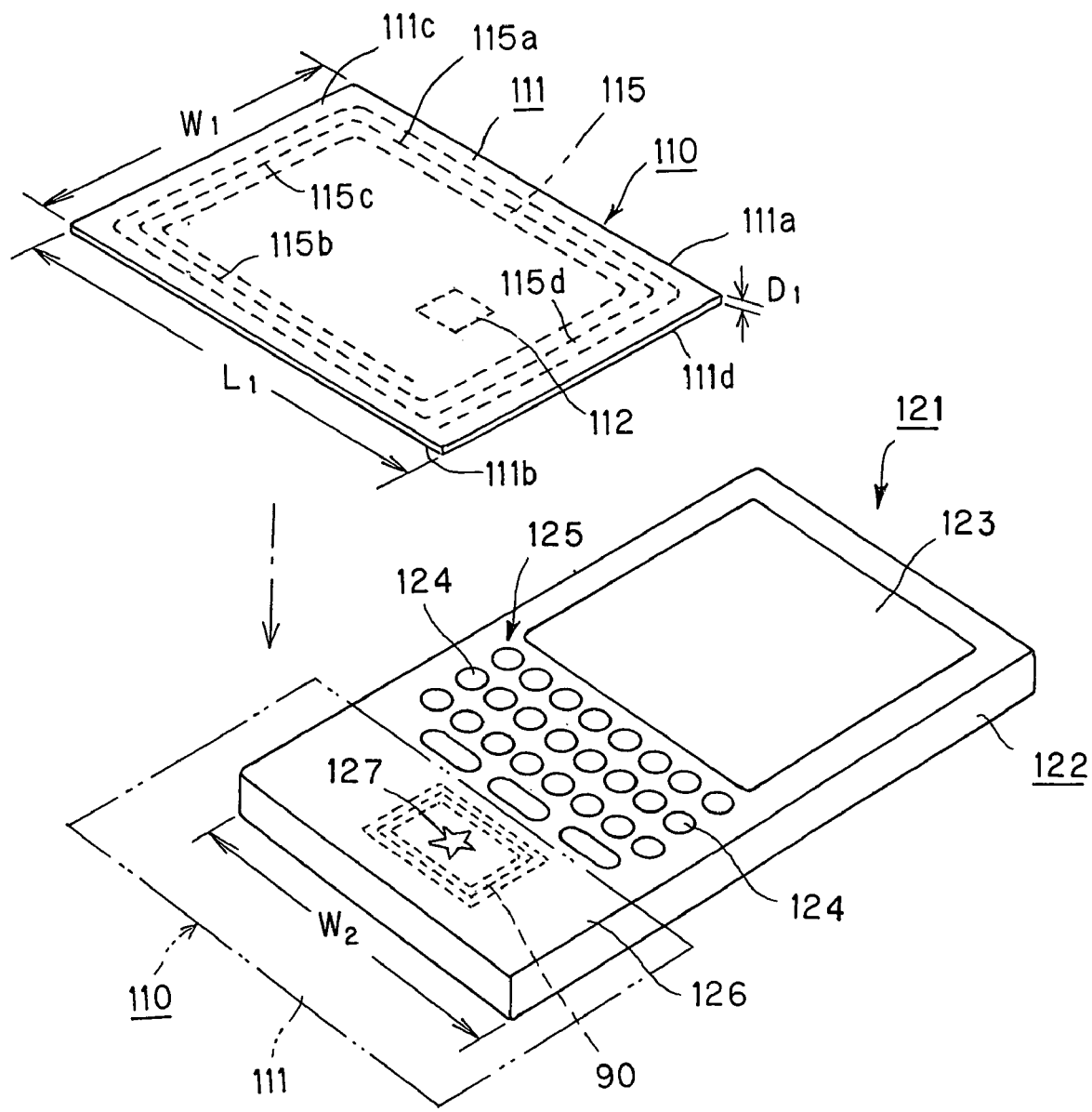
FIG. 29 is a perspective view of the communication terminal device as the electronic device according to the present invention and an IC card used in the communication terminal device.

The present invention is applicable to the aforementioned communication terminal device 70 shown in FIG. 18. More specifically, the present invention is applied to a communication terminal device 121 constructed as shown in FIG. 29 to be able to make communications. As shown in FIG. 29, the communication terminal device 121 has a rectangular metallic housing forming the device body. The housing 122 is made of a metal sheet having a good electrical conductivity such as a nonmagnetic aluminum sheet or brass sheet, a nonmagnetic stainless steel sheet or iron sheet, or the like. The housing 122 has a display unit 123 provided on one side thereof. The display unit 123 is formed from a liquid crystal panel. It is provided on the one side of the housing 122. The display unit 123 displays information to be processed by the communication terminal device 121 and how the information is processed, etc.

Also, the housing 122 has provided in the center of the one side thereof an input unit 125 including a plurality of operation buttons 124 for input of commands for various operations etc.

At the end portion of the side of the housing 122, opposite to the side where the display unit 123, there is provided a card mount 126 on which an IC card 110 that makes information communications with the communication terminal device 121. The card mount 126 is provided on the side of the housing 122 where the display unit 123 and input unit 125 are provided. In a position inside the housing 122, facing the card mount 126, there is provided the aforementioned plane asymmetric loop antenna 80 constructed as shown in FIG. 8 or cubic asymmetric loop antenna 90 constructed as shown in FIGS. 9 and 10. The communication terminal device 121 shown in FIG. 29 uses the loop antenna 90 shown in FIG. 10 as a communication antenna. The communication antenna is constructed as in the description already made of the aforementioned loop antennas 80 and 90, and will not be described in detail any more.

Further, the housing 122 has provided inside it a reader/writer (R/W) to write and read data to and from the IC card 110, and a controller to control the components of the communication terminal device 121. The controller controls the display unit 123 to display data or the like read by the R/W from the IC card 110 according to a command signal supplied from the input unit 125, for example.

Figure 30:
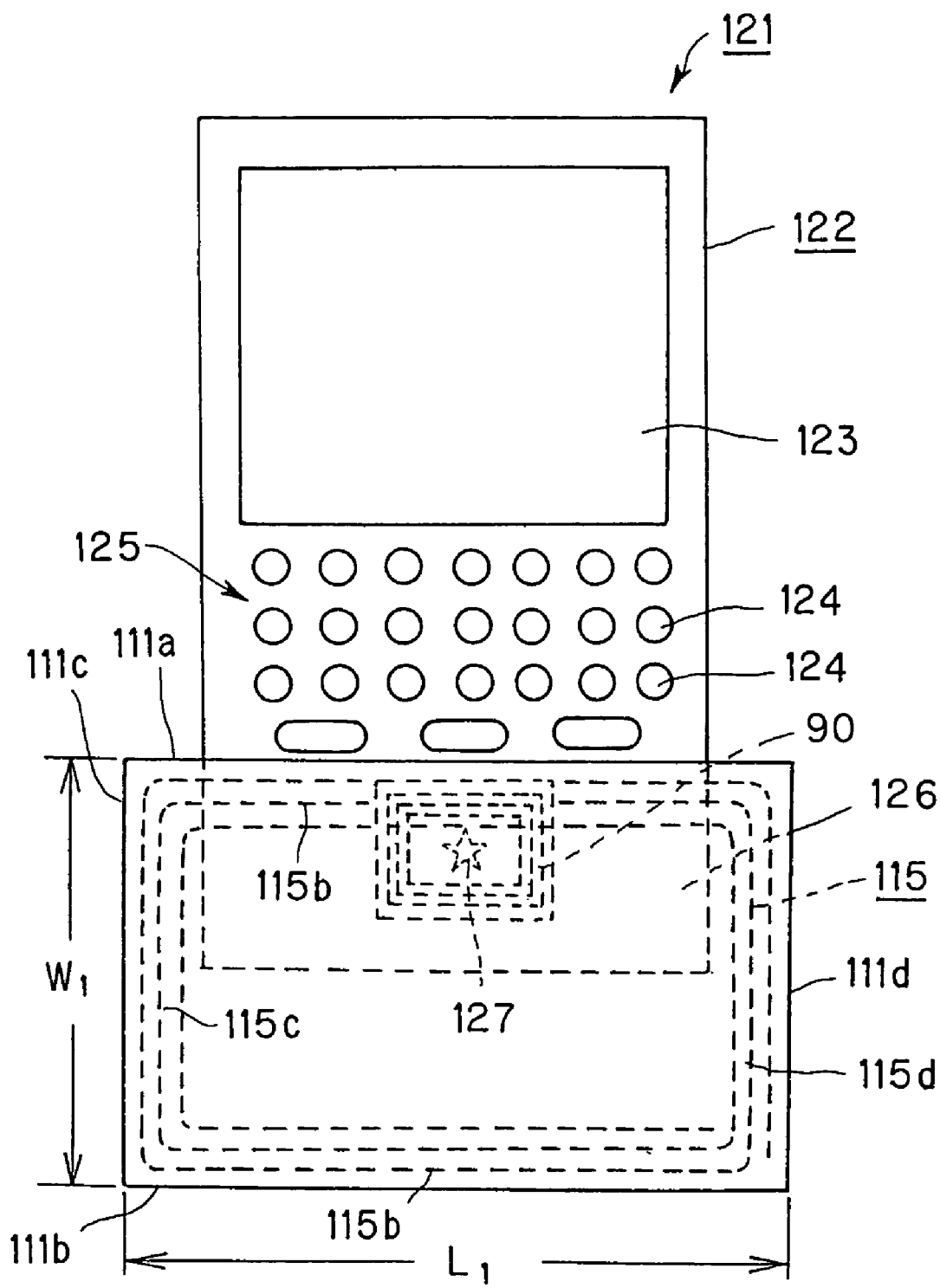
FIG. 30 is a plane view of the communication terminal device according to the present invention, to which the IC card is located in proximity.

The IC card 110 capable of sending and receiving information to and from the communication terminal device 121 will be described in detail below. The IC card 110 referred to herein is formed to have an ID card complying with the Japanese Industrial Standard (JIS). As shown in FIGS. 29 and 30, the IC card 110 is formed to have a rectangular shape having a long-side length $L_1$ of 86 mm, a short-side width $W_1$ of 54 mm, and a thickness $D_1$ of 0.76 mm. The IC card 110 includes a body 111 formed mainly from the material of the IC card 110. The card body 111 has built therein an IC (integrated circuit) 112 including a memory to store information to be sent to and received from the communication terminal device 121 and a circuit to control the communications, and other electronic parts.

The card body 111 has provided thereon an antenna 115 that communicates with the cubic asymmetric loop antenna 90 included in the communication antenna at the communication terminal device 121. The antenna 115 at the IC card 110 is formed to be a loop antenna by winding a conductor into a rectangular shape along the periphery of the rectangular card body 111, that is, along a pair of long sides 111a and 111b of the card body 111, opposite to each other, and a pair of short sides 111c and 111d opposite to each other. Namely, the antenna 115 provided at the IC card 110 is formed as a rectangular loop antenna having long sides 115a and 115b extending along the long sides 111a and 111b, respectively, of the card body 111 and short sides 115c and 115d extending along the short sides 111c and 11cd, respectively.

Note that in case any one of the log sides 115a and 115b extending along any one of the long sides 111a and 111b of the card body 111 of the rectangular IC card 110 is to be placed in proximity to the communication antenna for communication with the communication terminal device 121, the short sides 115c and 115d may not always be placed to extent along the other short sides 111c and 11d but may be oblique with respect to these short sides 111c and 111d.

In the antenna 115 provided at the IC card 110, the winding sections forming the long sides 115a and 115b, respectively, may be different in interval and width from each other, namely, the winding sections may be asymmetric. That is, the range of communications with the communication terminal device may be further widened by controlling the distribution of a magnetic field radiated from the antenna 115 with the winding interval and width of one long side 111a being increased.

The communication terminal device 121 according to the present invention has the cubic asymmetrical loop antenna 90 disposed in a position where only any one of the long sides 115a and 115b of the antenna 115 will overlap the loop antenna 90 when the IC card 110 including the body 111 formed as above to have the large rectangle and having the antenna 115 provided along the periphery of the card body 111 is placed in proximity and opposite to the card mount 126 provided on the surface of the housing 122.

Note that the card mount 126 formed on the surface of the housing 122 has provided thereon an index 127 that indicates the position of the cubic asymmetric loop antenna 90 disposed inside the housing 122 and also a position where the IC card 110 is in proximity to the communication antenna. The index 127 is formed by printing on the surface of the housing 122 or engraving in a part of the housing 122. The index 127 may be a symbol or figure as well as a character or the like indicating a position to which any one of the long sides 111a and 111b of the IC card 110 is placed in proximity.

The position of the loop antenna 90 provided inside the housing 122 of the communication terminal device 121 will be described in further detail. The loop antenna 90 is provided in a position where any one of the long sides 111a and 111b of the antenna 115 at the IC card 110 placed in proximity for correspondence to the index 127 will project from one end 122a of the housing 122 as shown in FIG. 30. At this time, the other long sides 115a or 115b of the antenna 115 at the IC card 110 faces the loop antenna 90.

More specifically, the loop antenna 90 at the communication terminal device 121 is disposed in a small area to extend over a distance shorter than the width $W_1$, along the short sides 111c and 111d, of the IC card 110 from one end 122a of the housing 122 as shown in FIG. 30.

In the communication terminal device 121 according to the present invention, when the IC card 110 is placed in proximity to the card mount 126 with any one of the long sides 111a and 111b being placed near the index 127, any one of the long sides 115a and 115b of the antenna 115 at the IC card 110 will face the loop antenna 90 and the other long side 115a or 115b will project out of the metallic housing 122.

In the communication terminal device 121 according to the present invention, when the IC card 110 is placed in proximity to the housing 122, the long sides 115a and 115b of the antenna 115 at the IC card 110 will not face the metallic housing 122. As a result, communications can be made between the communication terminal device 121 and IC card 110 to write or read information to or from the IC card 110 under no influence of the metallic housing 122.

That is, since communications between the communication terminal device 121 and IC card 110 can be achieved between the loop antenna 90 and the long sides 115a and 115b of the antenna 115, that do not face the metallic housing 122, the communications can be done with prevention of the inductance reduction caused by the metallic housing 122.

In the communication terminal device 121 according to the present invention, the width $W_2$ of a portion of the metallic housing 122 where the loop antenna 90 is disposed should desirably be smaller than the length $L_1$ of the IC card 110 to achieve a more positive communications with the IC card 110. With the above construction of the housing 122, the short sides 115c and 115d of the antenna 115 can be projected to the lateral side of the housing 122 when the IC card 110 is placed in proximity to the card mount 126 and any one of the long sides 115a and 115b is directed to overlap the loop antenna 90. Thus, the inductance reduction caused by the metallic housing 122 can be prevented more positively.

Figure 31:
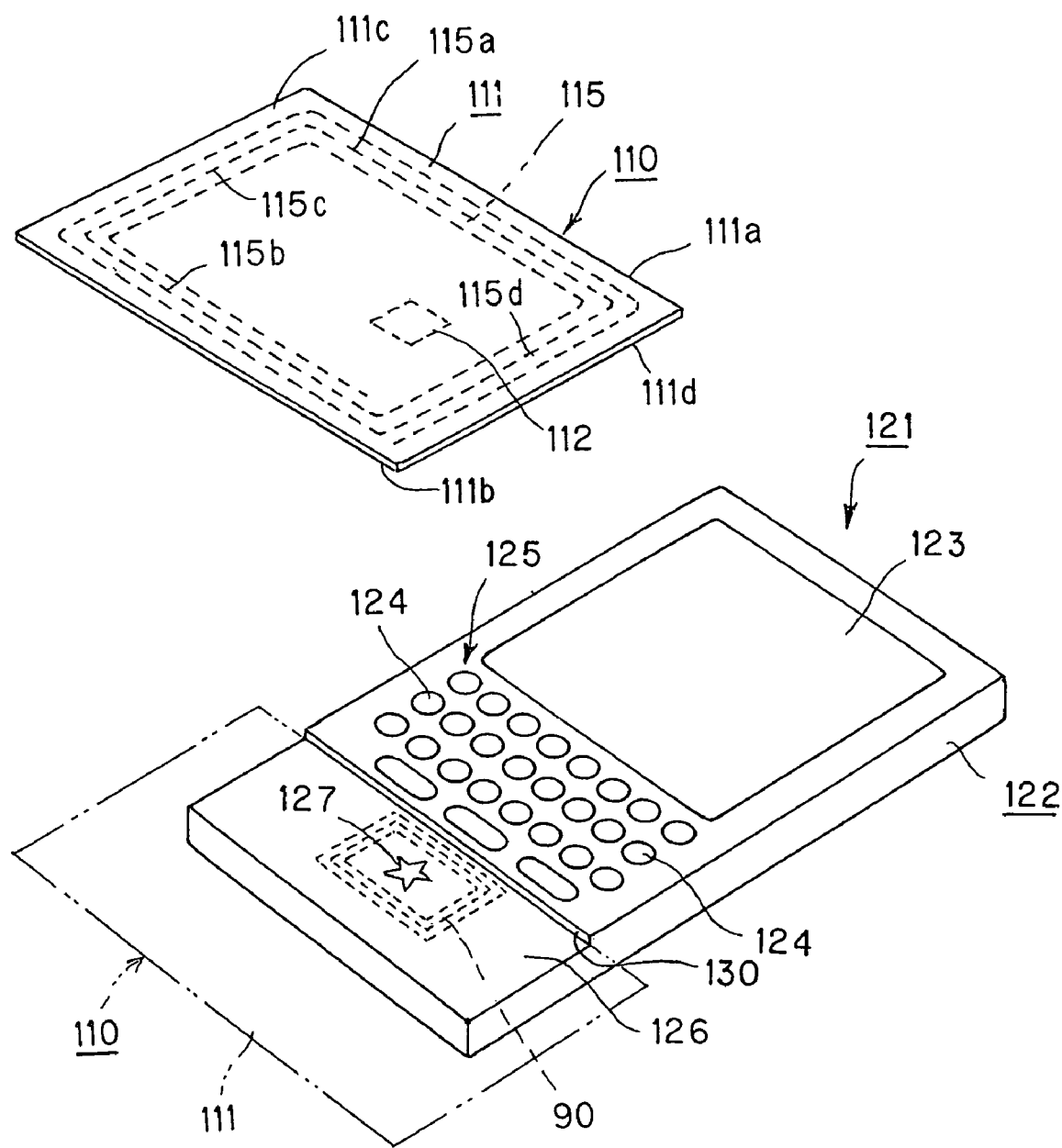
FIG. 31 is a perspective view of a variant of the communication terminal device and a variant of the IC card, according to the present invention.

In the communication terminal device 121 according to the present invention, a positioner 130 is provided at the card mount 126 to assure that the IC card 110 can be placed near the top of the card mount 126 with any one of the long sides 115a and 115b of the antenna 115 being superposed on the loop antenna 90 while the other long side 115a or 115b is kept from coming onto the metallic housing 122. As shown in FIG. 31, the positioning 130 is formed as a step any one of the long sides 111a and 111b of the IC card 110 on the card mount 126, that is to be superposed on the loop antenna 90, will abut.

Owing to the positioner 130 provided to define a position of the IC card 110 going to the communication terminal device 121 as above, the antenna 115 at the IC card 110 can be accurately positioned in relation to the loop antenna 90 to positively prevent the antenna 115 from being fully superposed on the metallic housing 122. Thus, it is possible to prevent the inductance reduction by the metallic housing 122 more positively.

Figure 32:
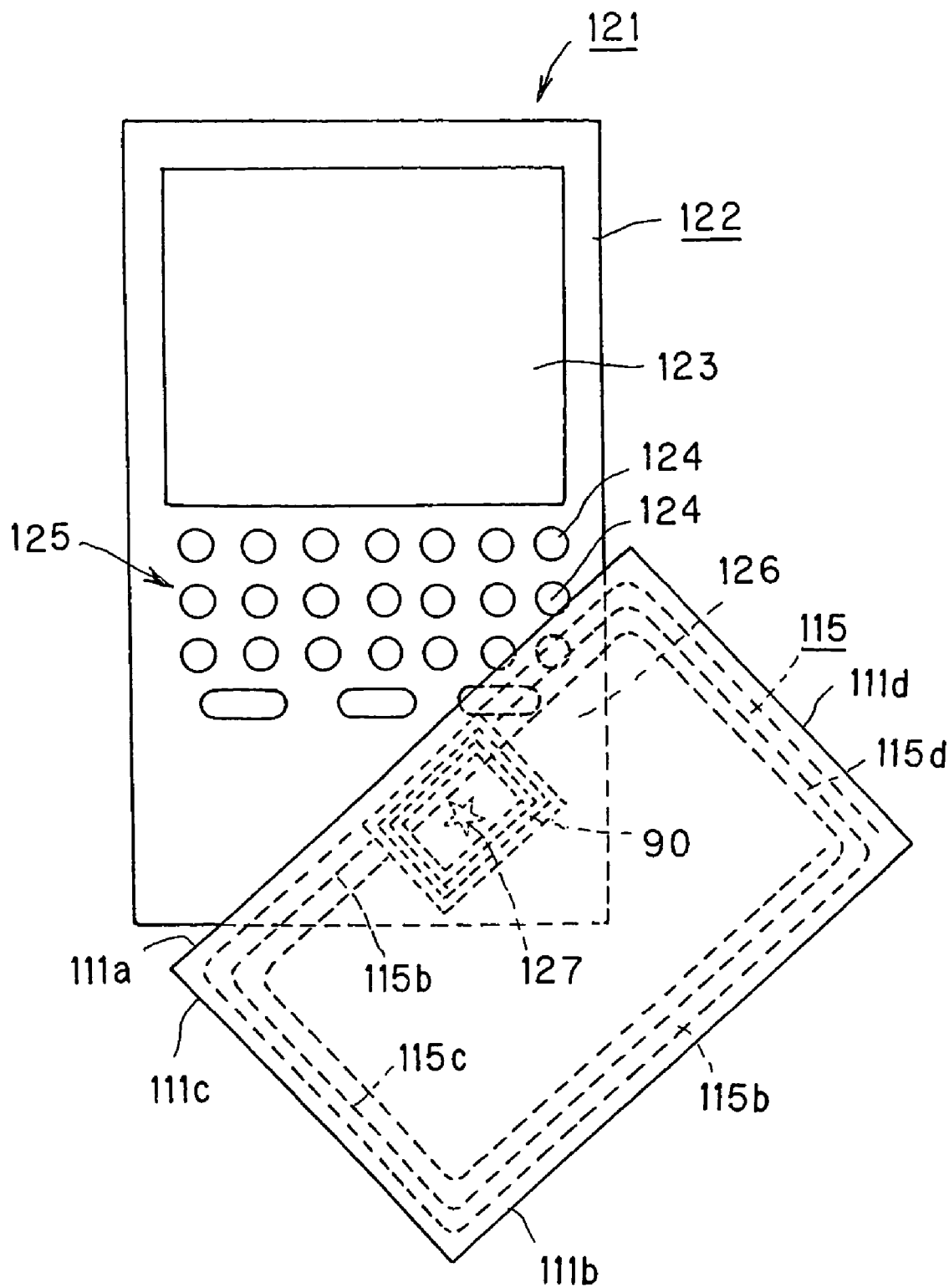
FIG. 32 is a plan view of another variant of the communication terminal device according to the present invention, to which the IC card is located in proximity.

Further in the communication terminal device 121 according to the present invention, the loop antenna 90 for communications with the IC card 110 may be provided at one corner of the metallic housing 122 as shown in FIG. 32. In this case, the IC card 110 is disposed to cover the corner of the metallic housing 122 where the loop antenna 90 is provided, as shown in FIG. 32. By forming the metallic housing 122 to be rectangular and disposing the loop antenna 90 at the corner of the rectangular housing 122, it is possible to dispose the IC card 110 on the card mount 126 with any one of the long sides 115a and 115b of the antenna 115 being superposed on the loop antenna 90 while the other long side 115a or 115b is kept from being on the metallic housing 122. Thus, the inductance reduction caused by the metallic housing 122 can be prevented as in the aforementioned communication terminal device 121 and positive communications between the IC card 110 and terminal device 121 are possible.

Figure 33:
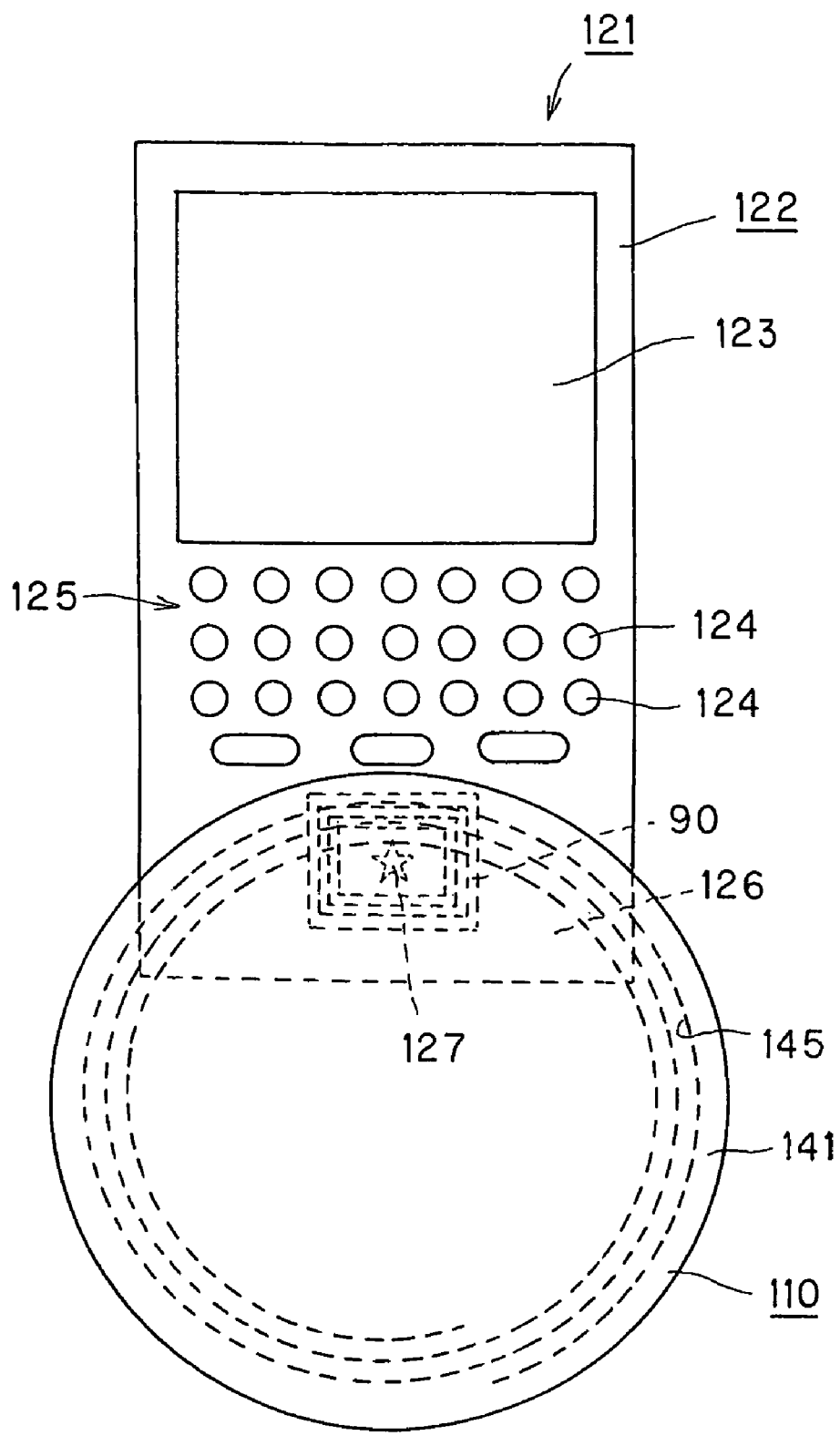
FIG. 33 is a plan view of still another variant of the communication terminal device to which the IC card is located in proximity.

Furthermore, the IC card 110 used in the communication terminal device 121 according to the present invention is not limited in shape to the aforementioned rectangular one but may be formed circular as shown in FIG. 33. Also, the IC card 110 may be provided with an annular antenna 145 formed by winding a conductor along the periphery of a disk-shaped card body 141. Also in this case, the loop antenna 90 is disposed at the communication terminal device 121 in a place where only a part of the annular antenna 145 will overlap the loop antenna 90 at the communication terminal device 121 while the rest of the antenna 145 is forced to be outside the metallic housing 122, when the circular IC card 110 is placed in proximity to the metallic housing 122. Also in this communication terminal device 121, there is provided the index 127 that indicates the position of the loop antenna 90 disposed inside the metallic housing 122 and also a position where the IC card 110 has the circumferential edge thereof put in proximity to the communication antenna.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

As having been described in the foregoing, the electronic device according to the present invention can make communications with the IC card with less influence of the metallic housing and thus can positively transfer information to be written to or read from the IC card.

The invention claimed is:

1. A communication-capable electronic device comprising:
    a housing for accommodating parts of the device; and
    a communication antenna disposed inside the housing to make communications with an IC card having a loop antenna built therein,
    the communication antenna being disposed in a location where a part of the antenna incorporated in the IC card is to face a part of the communication antenna, while the rest of the antenna in the IC card does not face that part of the communication antenna, when the IC card is located near the housing.

2. The device as set forth in claim 1, wherein the housing is made of a metal.

3. The device as set forth in claim 1, wherein the communication antenna is disposed at an end of the housing.

4. The device as set forth in claim 1, wherein in an area, facing the IC card, of the housing, there is provided a positioner to determine a position where the IC card faces the housing.

5. The device as set forth in claim 1, wherein:
    the IC card is square;
    the loop antenna is disposed along the periphery of the IC card; and
    the communication antenna is disposed in a position where one side of the loop antenna overlaps the communication antenna while the other side of the loop antenna, opposite to the one side, does not overlap the housing.

6. The device as set forth in claim 1, wherein:
the IC card is rectangular; and
the housing has at least the antenna provided thereon; and the width of the area of the housing, facing a part of the IC card, is smaller than the long-side length of the IC card.

7. The device as set forth in claim 6, wherein the communication antenna is disposed to extend form one end of the housing in an area smaller than the width of the short side of the IC card.

8. The device as set forth in claim 1, wherein the communication antenna includes a loop coil for inductive coupling.

9. The device as set forth in claim 8, wherein the loop coil is smaller than the antenna at the IC card, to which it is inductively coupled.

10. The device as set forth in claim 8, wherein the loop coil has a magnetic member.

11. The device as set forth in claim 10, wherein the magnetic member is disposed to face one main side of the loop coil, opposite to the other main side facing the IC card.

12. The device as set forth in claim 11, wherein the magnetic member has set therefor a specific permeability $\lambda'$ and a product $Ms \cdot t$ of saturation magnetization $Ms$ and thickness $t$.

13. The device as set forth in claim 12, wherein the magnetic member is penetrated in the center of the loop coil and disposed, at the side of the loop coil where the winding interval is small, to have one main side thereof directed to face the main side of the loop coil, opposite to the other main side facing the IC card.

14. The device as set forth in claim 13, wherein the magnetic member is formed smaller than the loop coil at the side of the loop coil where the winding interval is small while being larger than the loop coil at the side of the loop coil where the winding interval is large.

15. The device as set forth in claim 11, wherein the loop coil is formed from a plane winding of a conductor, whose sections opposite to each other across the center of the loop coil are disposed asymmetrically to be different in interval from each other.

16. The device as set forth in claim 15, wherein the loop coil is different in winding interval at one side thereof from at the other side in a direction in which the IC card is scanned.

* * * * *